(12) United States Patent
Nitagai et al.

(10) Patent No.: US 6,854,366 B2
(45) Date of Patent: Feb. 15, 2005

(54) PRODUCT RECOVERY APPARATUS AND PRODUCT RECOVERY METHOD

(75) Inventors: Osamu Nitagai, Nishitokyo (JP); Noriyuki Haseba, Nishitokyo (JP)

(73) Assignee: Citizen Watch Co., Ltd., Tokyo (JP)

( * ) Notice: Subject to any disclaimer, the term of this patent is extended or adjusted under 35 U.S.C. 154(b) by 85 days.

(21) Appl. No.: 10/312,654

(22) PCT Filed: Mar. 27, 2002

(86) PCT No.: PCT/JP02/02986
§ 371 (c)(1),
(2), (4) Date: Feb. 24, 2003

(87) PCT Pub. No.: WO02/092305
PCT Pub. Date: Nov. 21, 2002

(65) Prior Publication Data
US 2004/0074351 A1 Apr. 22, 2004

(30) Foreign Application Priority Data
May 14, 2001 (JP) ........................................ 2001-143277

(51) Int. Cl.[7] .............................................. B23B 37/00
(52) U.S. Cl. ............................ 82/52; 82/901; 409/131
(58) Field of Search ........................... 82/124, 52, 901; 408/58, 59; 409/131, 137, 249

(56) References Cited

U.S. PATENT DOCUMENTS

| | | | | |
|---|---|---|---|---|
| 2,169,675 A | * | 8/1939 | Bays ............................ | 175/66 |
| 4,514,936 A | * | 5/1985 | Hurtado ......................... | 451/28 |
| 5,467,835 A | * | 11/1995 | Obermeier et al. .......... | 175/209 |
| 6,299,393 B1 | * | 10/2001 | Anders ......................... | 409/131 |

FOREIGN PATENT DOCUMENTS

| | | |
|---|---|---|
| JP | 57-126947 | 8/1982 |
| JP | 60-76901 | 5/1985 |
| JP | 5-51543 | 7/1993 |
| JP | 9-94704 | 4/1997 |

* cited by examiner

*Primary Examiner*—Willmon Fridie, Jr.
(74) *Attorney, Agent, or Firm*—Manabu Kanesaka

(57) ABSTRACT

There is provided a product recovery apparatus in which mixture of cut wastes or a coolant into a receiver box is reduced and which can be disposed in the vicinity of a portion to be processed or in a processing chamber and which saves space and has high recovery rate of products. The product recovery apparatus for recovering the product from a machine tool for processing a material held by material hold means to produce the product, comprises: a product recovery tube for receiving the product; suction air generation means for bringing the product into the product recovery tube by suction of air; and a recovery container of the product disposed between the suction air generation means and product recovery tube. The recovery container may include a coolant reservoir portion for pooling a coolant in the recovery container, and the product recovered by the product recovery tube may be allowed to drop into the coolant in the coolant reservoir portion.

28 Claims, 17 Drawing Sheets

PRODUCT RECOVERY APPARATUS AND PRODUCT RECOVERY METHOD

TECHNICAL FIELD

The present invention relates to a product recovery apparatus and a product recovery method in which after a product has been processed, the processed product is automatically recovered.

BACKGROUND TECHNIQUE

There have been machine tools, for example, automatic lathes for supplying a longitudinal bar material through a through hole of a main shaft from a back part of the main shaft, feeding the bar material in a main shaft axis line direction by each predetermined length, and continuously performing processing such as turning and grinding, or for supplying a material for one product to the main shaft from a front part of the main shaft by a robot, and the like.

Among these, in the former machine tool, the tip end of the bar machine tool is projected from the tip end of the main shaft by a predetermined length, a tool rest or head stock is moved to perform predetermined processing, and thereafter a product is cut from the bar machine tool with tools such as a cut-off tool. Subsequently, the cut/separated product is recovered by a product recovery apparatus.

FIG. 16 shows a related art of the former machine tool, and is a schematic view of a main part of an automatic lathe including a product recovery apparatus.

In FIG. 16, a head stock 2 is disposed on a base 4 of the automatic lathe, and a main shaft 1 is rotatably supported on the head stock 2. The head stock 2 freely moves forwards and backwards along a screw shaft 3 on the base 4 in a Z-direction which is the same direction as that of an axis line of the main shaft 1.

A support member 7 for supporting a guide bush 6 is disposed before the head stock 2 (on the left side of FIG. 16), and the tip end of a bar material B supplied through the through hole of the main shaft 1 is supported by the guide bush 6. A tool rest such as a comb teeth-shaped tool rest for holding a plurality of tools T is disposed in the vicinity of the support member 7, so that the tools T such as a cutting tool for performing predetermined turning and a cut-off tool for performing cutting-off can be disposed in a processing position before the guide bush 6.

In the automatic lathe shown in FIG. 16, the head stock 2 can move by the screw shaft 3. Moreover, the tip end of the bar material B is projected from the guide bush 6, the head stock 2 is fed in the Z-direction, and the tool T is fed in an X-direction, so that the tip end of the bar material B is processed. After the processing ends, in a vicinity position before the guide bush 6, the bar material B is cut off by the tool T such as the cut-off tool, and a product W is separated from the bar material B. During the processing of the bar material B by the tool T, a coolant supplied from a coolant nozzle 8 is spouted toward the tool T and bar material B.

A product recovery apparatus 20 is disposed before the head stock 2. Moreover, the apparatus 20 includes: a cylinder 21 including a stretchable piston rod 21a; a chute 22 for product recovery which moves forwards and backwards between a position right under a cover 9 disposed below the guide bush 6 and a retreat position far from the support member 7; a receiver box 25 for receiving/recovering the product W via the chute 22; and a funnel-shaped member 24 disposed between the receiver box 25 and chute 22. The chute 22 is attached to the tip end of the piston rod 21a of the cylinder 21, and reciprocates/moves between the position right under the cover 9 and the retreat position by driving the cylinder 21.

In the product recovery apparatus 20 constituted as described above, the cylinder 21 is driven to position the chute 22 right under the cover 9 immediately before the product W is cut off. The chute 22 receives the cut off and falling product W. As shown in FIG. 16, since the chute 22 is inclined toward the receiver box 25, the product slides down along the chute 22, and is transferred to the funnel-shaped member 24. Subsequently, the product W drops and is recovered into the receiver box 25 disposed under the funnel-shaped member 24.

Additionally, the product recovery apparatus 20 shown in FIG. 16 has the following problem.

That is, since the coolant is continuously supplied from the coolant nozzle 8 even at a cut-off time, the coolant is recovered together with the product W into the receiver box 25 from the chute 22 via the funnel-shaped member 24. Moreover, since the chute 22 and funnel-shaped member 24 are disposed in a processing chamber of the automatic lathe in an exposed state, a large amount of cut wastes generated during the processing enters the receiver box 25 together with the coolant, and the cut wastes adhere to the chute 22 and funnel-shaped member 24. Moreover, the products W are thereby mixed/recovered together with the coolant and cut wastes in the receiver box 25, and there is a disadvantage that the receiver box 25 soon becomes full. Furthermore, the product W is entangled with or caught by the cut wastes in the chute 22 and funnel-shaped member 24, the product W is mixed/recovered together with the coolant and cut wastes in the receiver box 25, and this causes a disadvantage that it takes a lot of trouble to recover the product W separately from the cut wastes.

Furthermore, to cut/form micro components such as clock components, the product W flowing together with the coolant into the receiver box 25 sometimes flows outside the receiver box 25 together with the coolant running over the receiver box 25, and there is a possibility that recovery rate of the product W drops.

To solve the problem, for example, in Japanese Patent Application Laid-Open No. 1997-94704, a product recovery apparatus is disclosed which includes a tube also having a guide function of preventing the component from vibrating at a cut-off time and which uses the tube to recover the cut-off component by air suction.

FIG. 17 shows a schematic view of the product recovery apparatus described in the Japanese Patent Application Laid-Open No. 1997-94704.

It is to be noted that mechanisms such as the head stock, main shaft, tool, disposed in the automatic lathe, for processing the bar material B are the same as those of the automatic lathe shown in FIG. 16, and therefore are denoted with the same reference numerals, and detailed description thereof is omitted.

A product recovery apparatus 30 includes: a guide tube 31 for guiding the bar material B at the cut-off time so that the tip end of the material does not vibrate; an air tube 32 connected to the guide tube 31; a vacuum pump 36 for performing air suction; and a receiver box 35 which receives the recovered product W.

The vacuum pump 36 is connected to the air tube 32 via a branch pipe 36a branched halfway from the air tube 32. The guide tube 31 is formed of a cylindrical member of a metal, and supported on the same axis line as that of the main shaft 1 by a support member 33 fixed to a table 5 of the automatic lathe. Moreover, the tip end of the tube 31 is positioned so that a part of the product W is inserted into the tip end of the guide tube 31 at the cut-off time of the product W from the bar material B.

Moreover, opening/closing means for closing an opening on an outlet side of the air tube 32 is disposed on a product outlet side of the air tube 32, that is, on a receiver box 35 side so as to prevent air from being sucked on the product outlet side of the air tube 32, when the vacuum pump 36 is driven to perform the air suction.

The opening/closing means includes a cylinder 38, and an opening/closing member 39 attached to the tip end of a stretchable piston rod 38a of the cylinder 38. To recover the product W by the air suction, the cylinder 38 is driven to close the opening of the air tube 32 on the outlet side, and the opening/closing member 39 is opened after the suction of the product W, so that the product W is allowed to drop, and recovered in the receiver box 35.

According to the product recovery apparatus 30, since the product W cut off by the guide tube 31 is recovered, the amount of the coolant and cut wastes recovered together with the product W in the receiver box 35 becomes remarkably small. Moreover, the product recovery apparatus 30 can be disposed apart from a processed portion or outside the processing chamber, and therefore there is an advantage that influence of the cut wastes flied during the processing is not easily exerted.

However, in the product recovery apparatus described in the Japanese Patent Application Laid-Open No. 1997-94704, the branch tube 36a is branched halfway from the air tube 32 and connected to the vacuum pump 36, the cut wastes and coolant sucked from the guide tube 31 are therefore sucked into the vacuum pump 36, and there is a problem that an operation defect of the vacuum pump 36 is possibly caused. Moreover, with the product recovery apparatus 30 disposed outside the processing chamber, there is a problem that the automatic lathe is enlarged.

Furthermore, the product W recovered by the air suction collides against the opening/closing member 39 at high speed, and therefore there is a problem that the product W is possibly scratched and deformed. Moreover, in the structure, there is a gap between the opening/closing means and receiver box 35, therefore the product W which has forcefully jumped into the receiver box 35 jumps out of the receiver box 35, and there is a problem that the recovery rate of products drops. Additionally, a mechanism for opening/closing the opening/closing member 39 is complicated, and there is a problem that an apparatus price rises.

It is to be noted that in addition to the above-described Japanese Patent Application Laid-Open No. 1997-94704, a product recovery apparatus described in Japanese Patent Application Laid-Open Nos. 1985-76901 and 19821-26947 is known. However, either constitution is complicated, the apparatus price is high, and it is difficult to dispose the apparatus in the processing chamber filled with the cut wastes and coolant mist.

Moreover, there is a mode for grasping and conveying the product W by a chuck in the apparatuses described in the above-described publications, but this apparatus has a problem that it is difficult to recover the product depending on the shape of the product W.

On the other hand, in the latter machine tool for supplying the material for one product to the main shaft to process the material by relative movement with the tool, discharging the processed product, and again supplying the next material to repeat the processing, in order to supply the material and discharge the product in a short time, it is general to dispose a plurality of grasp means for supplying the material and discharging the product on the tip end of a robot for conveyance (not shown) and to supply the material and discharge the product from a position before the main shaft.

However, this method has the following problem. It is necessary to dispose at least two or more grasp means separately for the material supply and for the product discharge on the tip end of the robot for conveyance, and therefore a conveyable weight of the robot for conveyance increases. Moreover, before the main shaft, the robot for conveyance is positioned in at least two positions, and it is necessary to complicate the control and to secure a space around the main shaft. Furthermore, it is necessary to reduce a conveyance speed of the robot for conveyance, and as a result a rise of equipment cost and decrease of productivity are caused.

The present invention has been developed in consideration of the above-described problems, and an object thereof is to provide a product recovery apparatus and a product recovery method which can be applied to various types of products and which can be disposed in the vicinity of a portion to be processed or in a processing chamber filled with cut wastes and mist of the coolant and by which the cut wastes are prevented from being mixed into a receiver box and recovered products are prevented from being damaged and which save space and have high recovery rate of products.

DISCLOSURE OF THE INVENTION

To achieve the object, according to the present invention, there is provided a product recovery apparatus which recovers a product from a machine tool for processing a material held by material hold means and producing the product, comprising: a product recovery tube for receiving the product; suction air generation means for bringing the product into the product recovery tube by air suction; and a recovery container of the product disposed between the suction air generation means and the product recovery tube.

It is to be noted that here the "material hold means" includes all means capable of holding the material, such as a type for supporting the material like a bush, a type for grasping the material like a collet chuck and scroll chuck, a type of adsorbing the material like a magnet chuck and vacuum chuck, and a combination of these.

A coolant reservoir portion for pooling a coolant may be disposed in the recovery container. Moreover, the coolant reservoir portion may include a discharge port of the coolant, and a valve for closing the discharge port at an air suction time by the suction air generation means.

Furthermore, the product recovered by the product recovery tube may be allowed to drop into the coolant pooled in the coolant reservoir portion.

Moreover, a product receiver for receiving the product is disposed inside the recovery container, and the product receiver may freely be taken out of the recovery container.

According to another aspect of the present invention, at least a portion of a bottom of the product receiver is disposed apart from the bottom of the recovery container, and in cut wastes and dusts sucked together with the product, the cut wastes and dust smaller than the product are separated from the product, and precipitated on the bottom of the recovery container.

According to further aspect of the present invention, a roof portion of the recovery container is formed in an inclined shape, and the air suction tube is connected to a vertex side of the roof portion.

According to still another aspect of the present invention, the recovery container is formed of a container upper part and container lower part, and the container upper part is connected to the air suction tube and product recovery tube, so that the product is recovered in the container lower part.

The container lower part and container upper part are detachable from each other, and there may be disposed elevator means for relatively moving up and down the container lower part or container upper part, and movement means for relatively moving the container lower part or container upper part in a transverse direction.

Moreover, there may be disposed a plurality of container lower parts, location means for relatively moving the container lower parts or container upper part and locating one of the container lower parts under the container upper part, and elevator means for relatively moving up and down the container lower parts or container upper part.

According to still another embodiment of the present invention, there are disposed a plurality of the coolant reservoir portions and/or the product receivers, and location means for moving and locating the coolant reservoir portions and/or the product receivers into predetermined positions.

According to the present invention, there is provided a product recovery method of relatively moving a tool and material to perform processing, and recovering a processed product after the processing ends, comprising the steps of: positioning a product recovery tube for recovering the product by suction air opposite to the product being processed; disposing a recovery container of the product between suction air generation means for generating the suction air and the product recovery tube; inserting a portion of the product into the product recovery tube, when processing is performed to release the product from the material hold means or to cut the product from the material; driving the suction air generation means simultaneously with the start of the release of the product from the hold means or the cutting-off processing, or in a predetermined timing after the cutting-off processing starts; and stopping the suction air generation means, after the product released from the hold means or the product cut from the material is recovered in the recovery container.

BRIEF DESCRIPTION OF THE DRAWING

FIGS. 3(a) and 3(b) are explanatory views of a constitution and function of a valve for opening/closing a discharge port of coolant, wherein FIG. 3(a) is a sectional view showing a state in which a discharge port is closed, and FIG. 3(b) is a sectional view showing a state in which the discharge port is open;

BEST MODE FOR CARRYING OUT THE INVENTION

Preferred embodiments of the present invention will be described hereinafter in detail with reference to the drawings.

[First Embodiment]

First, a first embodiment of the present invention will be described with reference to FIGS. 1 to 3 and 6.

Figure 1:
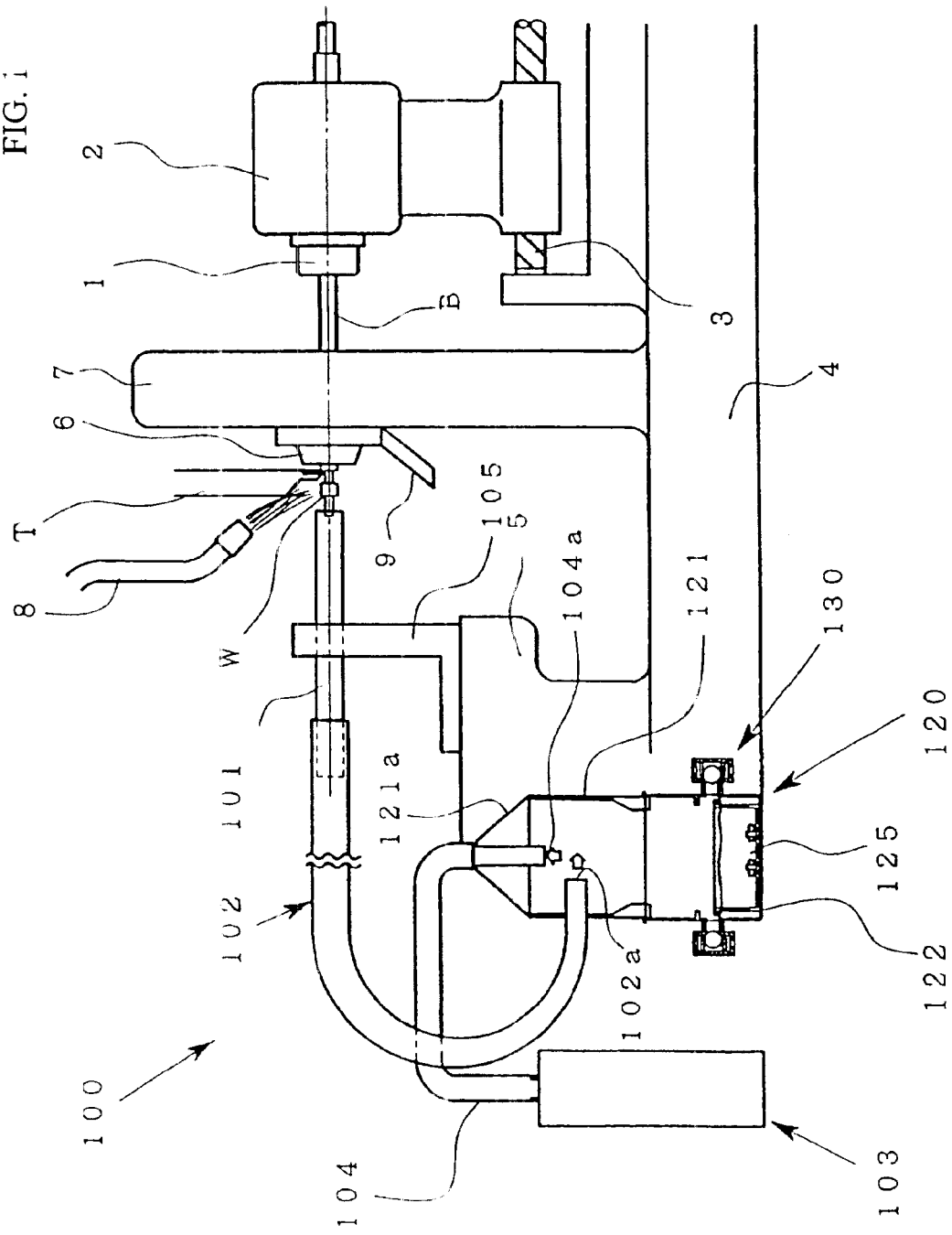
FIG. 1 is a schematic view of a main part of an automatic lathe including a product recovery apparatus according to a first embodiment of the present invention.

FIG. 1 is a schematic view of a main part of an automatic lathe including a product recovery apparatus according to the first embodiment of the present invention.

A product recovery apparatus 100 includes: a recovery container 120 disposed in a processing chamber of a machine tool such as an automatic lathe; a product recovery tube 102 and air suction tube 104 connected to the recovery container 120; and suction air generation means 103 including a vacuum pump and control valve to generate suction air for recovering a product W via air suction tube 104, the recovery container 120 and product recovery tube 102.

For the product recovery tube 102 and air suction tube 104, a stretchable and bendable flexible tube which is not easily collapsed by a negative pressure by driving the suction air generation means 103 is preferably used.

A linear tube 101 formed of a metal or resin separately from the product recovery tube 102 is attached to the tip end of the product recovery tube 102. The tube 101 is supported on the same axis line as the axis line of the main shaft 1 by a support member 105 disposed on a table 5. When the product W is cut from a bar material B as a material, a portion of the product W is positioned in a hole of the tube 101.

It is to be noted that at this time a half or more portion of the product W is preferably inserted into the hole of the tube 101 to prevent the cut-off product W from dropping.

The tube 101 is formed to such an extent that a hole inner diameter is slightly larger than a maximum diameter of the product W. The tube 101 functions as a guide for inhibiting the tip end of the product W from swinging, when the product W is cut from the bar material B. By the guide, it is possible to stably perform cut-off processing. Moreover, cut wastes R generated during the cut-off processing drop and are recovered in a cut waste recovery portion disposed below.

The recovery container 120 having a circular section shape has a two-divided constitution including a container upper part 121 and container lower part 122, the container upper part 121 is fixed to a fixing portion of the table of the machine tool, and the container lower part 122 can be detached from the container upper part 121. To form the recovery container 120 in a sealable structure, a seal member such as a packing for keeping airtightness in the recovery container 120 is disposed in a connection portion of the container upper part 121 and container lower part 122.

A roof portion 121a of the container upper part 121 is formed in a conical shape, so that the cut wastes R do not easily pile up on the recovery container 120 in the arrangement in the processing chamber of the machine tool.

Moreover, the air suction tube 104 is connected to the top of the roof portion 121a, and opens in the vicinity of the top of the roof portion 121a in the container upper part 121. Furthermore, the product recovery tube 102 is connected to the side surface of the container upper part 121 below the roof portion 121a. Since the opening of the air suction tube 104 is disposed in a position higher than that of the opening of the product recovery tube 102, the coolant and cut wastes R sucked into the recovery container 120 together with the product W via the product recovery tube 102 are prevented from being sucked into the air suction tube 104. As a result, special dustproof countermeasures for the suction air generation means 103 such as attachment of a filter member of net and replacement of the filter member become unnecessary.

Figure 2:
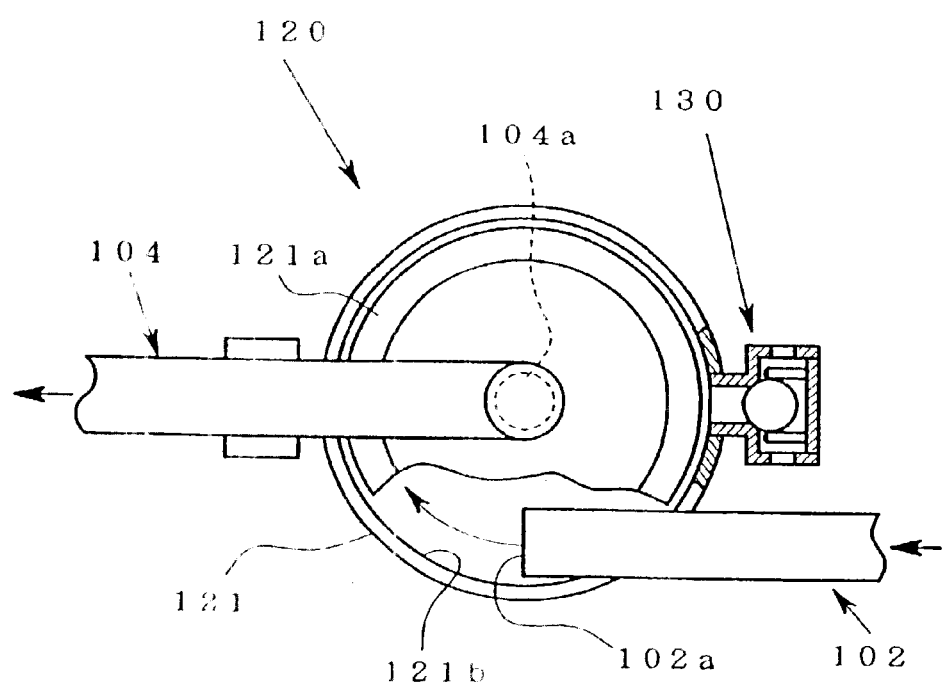
FIG. 2 is a partially broken plan view seen from right above a recovery container of FIG. 1.

FIG. 2 is a plan view seen from right above the recovery container 120, and a part of the container 120 is broken for convenience of the description.

As shown in FIG. 2, the product recovery tube 102 is connected to the container upper part 121 in a position eccentric from the center of the recovery container 120, and the product W recovered by air suction is sucked into the recovery container 120 from a tangent direction with respect to an inner wall 121b of the container upper part 121. In this case, an angle at a time when the product W collides with the inner wall 121b is small, and shock at the collision time is relaxed.

In the container lower part 122, a coolant reservoir portion 123 is formed to pool the coolant sucked together with the product W into the recovery container 120. In the coolant reservoir portion 123, a product receiver 125 is contained which can freely be inserted into or removed from the coolant reservoir portion 123. The product W sucked into the recovery container 120 via the product recovery tube 102 drops in the coolant reservoir portion 123, and is recovered in the product receiver 125.

Since the coolant pooled in the coolant reservoir portion 123 functions as cushion at this time, the product W is prevented from being scratched or deformed by collision, and a quality of the product processed with good dimensional precision can be maintained. Moreover, the coolant pooled in the coolant reservoir portion 123 can prevent the product W from being oxidized.

The product receiver 125 is constituted of a perforated member, and therefore fine cut wastes generated at a turning time, and dusts such as micro particulate abrasive grains generated at a grinding time are separated from the product and precipitated, when the product is sucked/recovered or the product receiver 125 is removed. Examples of the perforated member include a meshed or perforated steel plate having a size such that the product does not pass through.

A discharge port 122a is formed in the side surface of the container lower part 122 for discharging an excess coolant from the recovery container 120, when the coolant recovered together with the product W exceeds a given amount. The coolant flowing out of the discharge port 122a is recovered via a coolant circulation tube 136. At an air suction time, the inside of the recovery container 120 needs to be kept to be airtight. For this, a valve 130 for closing the discharge port 122a at the air suction time is disposed in the recovery container 120 of this embodiment.

In this case, when a distance to the discharge port 122a from an inner bottom surface of the recovery container 120 is set to be large, and the coolant reservoir portion 123 is formed to be deep, a large number of recovered products can be contained, and collision of the products with one another in a recovered time can securely be avoided.

Moreover, for the valve 130 disposed in the discharge port 122a, various types can be used as long as the discharge port 122a is closed to keep the airtightness of the recovery container 120 at the air suction time, the driving of the suction air generation means 103 is stopped to raise an inner pressure of the recovery container 120 to the same pressure as outside air pressure or to pressure higher than the outside air pressure, and then the discharge port 122a can be opened by the coolant. A solenoid valve opened/closed by a timing signal outputted with the driving and stopping of the suction air generation means 103, or a mechanical type for opening/closing the valve by a pressure difference exerted on a valve body may also be used.

Figure 3A:
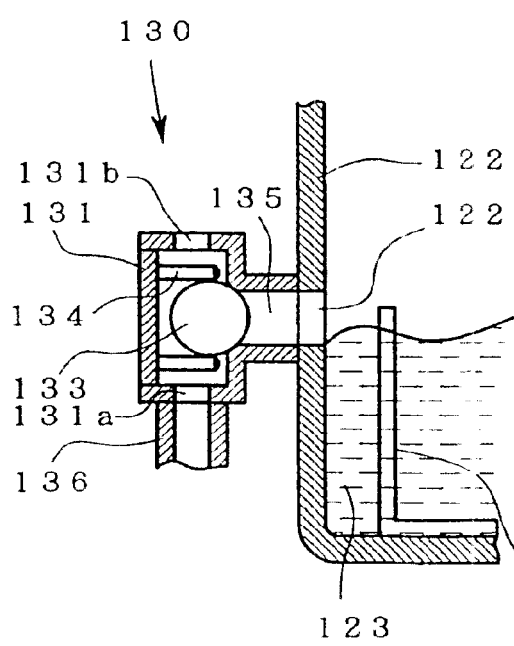
Figure 3B:
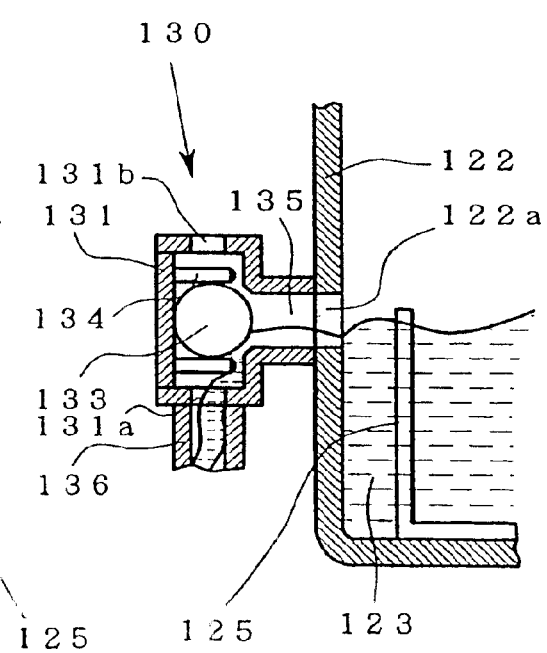

As shown in FIGS. 3(a) and 3(b), the valve 130 or is embodiment includes: a valve body 131 attached to the side surface of the container lower part 122; a ball-shaped valve body 133 which is disposed in the valve body 131 and which freely moves; and a valve body receiver 134 for holding the valve body 133 so that the valve body 133 freely moves between a position for opening the discharge port 122a and a closing position. A coolant passage 135 connected to the discharge port 122a is formed in a side portion of the valve body 131, and a hole 131a connected to the coolant circulation tube 136 is formed in a bottom part. Moreover, a hole 131b connected to the outside is formed in the upper part of the valve body 131. In this case, the upper part of the valve body 131 is released and the coolant smoothly drips via the hole 131a.

As shown in FIG. 3(a), when the suction air generation means 103 is driven and the pressure in the recovery container 120 is lower than an external pressure, the valve body 133 is sucked toward a coolant passage 135 side to close the discharge port 122a.

Moreover, as shown in FIG. 3(b), when the suction air generation means 103 stops and the pressure inside the recovery container 120 becomes the same as the outside air pressure, the valve body 133 is pushed by a weight of the valve body 133 itself and the pressure of the coolant applied to the valve body 133, and detached from the coolant passage 135 to open the discharge port 122a. It is to be noted that even with the inner pressure of the recovery container 120 higher than the outside air pressure, the valve body 133 naturally moves to open the discharge port 122a.

In this case, the coolant running over the coolant reservoir portion 123 flows out to the coolant circulation tube 136 via the discharge port 122a and is recovered.

According to the valve 130 constituted as described above, it is unnecessary to dispose a driving apparatus for opening/closing the valve body 133, and there is an advantage that a simple and inexpensive apparatus can be provided.

Moreover, as not shown, air jet means for spouting compressed air toward a port portion of the tube 101 may also be disposed. When the air jet means is disposed in this manner, and air is spouted to the product recovery tube 102 simultaneously with the stopping of the air suction, the inner pressure of the recovery container 120 is set to be higher than the outside air pressure, the coolant or cut wastes sticking to the inside of the product recovery tube 102 are blown off, and the inside of the tube is cleaned.

[Description of Recovery Method]

A product recovery method of the present invention will next be described together with the function of the product recovery apparatus constituted as described above with reference to FIG. 6.

Figure 6:
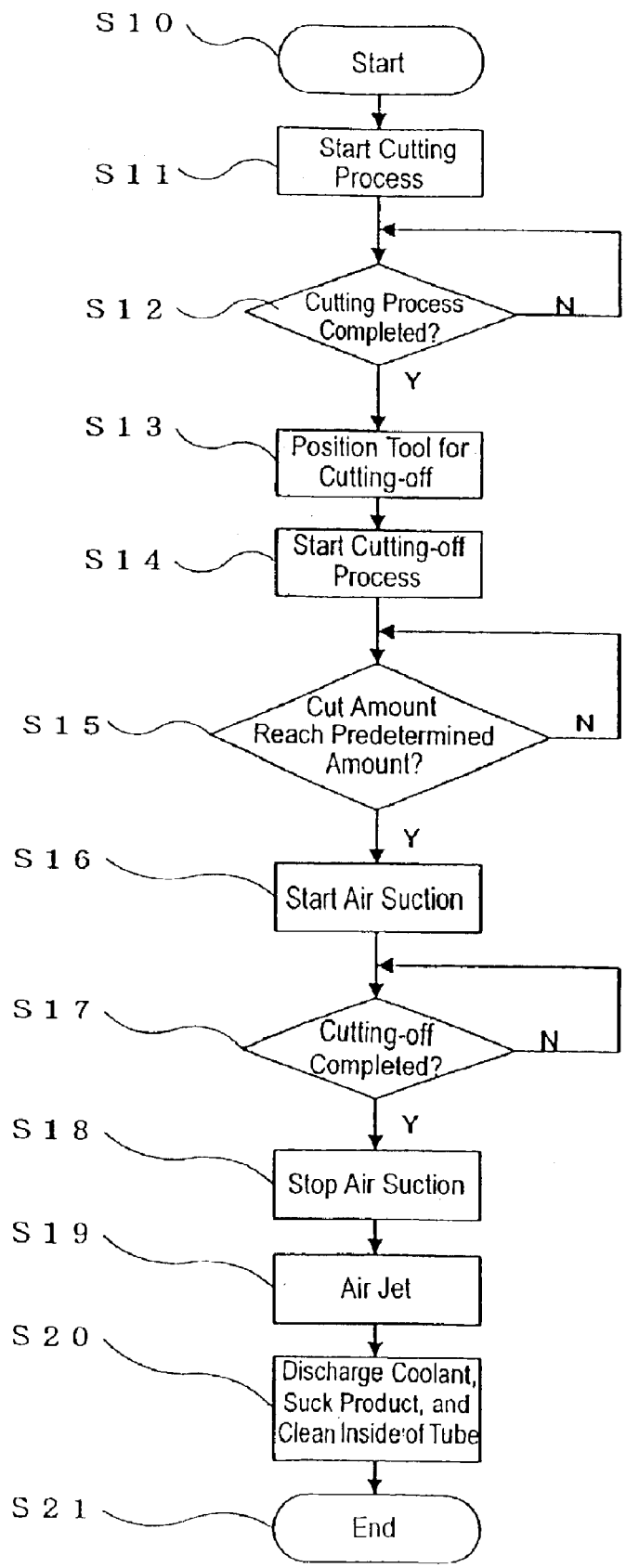
FIG. 6 is a flowchart showing the function of the product recovery apparatus of FIGS. 1 to 5.

FIG. 6 is a flowchart showing an operation of the product recovery apparatus 100 in one cycle from when the bar material B projected from the guide bush 6 by a predetermined length starts to be processed until the product W is cut from the bar material B and recovered.

While the bar material B is projected from the guide bush 6 by the predetermined length, a chuck of the main shaft (not shown) is closed to grasp the bar material B. Moreover, the coolant is spouted to a portion to be processed from the coolant nozzle 8, and a series of operation is started (step S10).

Subsequently, the tool T such as a cutting tool is positioned in a processing position, and performs predetermined processing by movement of the head stock 2 in a Z-axis direction and movement of the tool T in the X-direction (step S11).

When the cutting processing ends (step S12), the tool T for cutting-off such as a cut-off tool is positioned in the processing position (step S13), and cutting-off processing is started (step S14).

It is to be noted that at this time the tip end of the product W is inserted into the hole of the tube 101 and guided and therefore the product W is inhibited from swinging by a force applied to the product W at the cutting-off time.

When a cut depth of the tool T reaches a predetermined dimension (step S15), the suction air generation means 103 starts air suction (step S16).

When the cutting-off is completed (step S17), and the product W is cut from the bar material B, the product W is passed through the tube 101 and product recovery tube 102 and sucked into the recovery container 120.

Since the sucked product W collides with the inner wall 121b of the recovery container 120 at a small angle substantially from the tangent direction, impact at the collision time of the product W with the inner wall 121b is reduced, and the product W is prevented from being scratched or deformed. The product W drops into the coolant reservoir portion 123, and is recovered by the product receiver 125, and the impact by the falling is absorbed by the coolant pooled in the coolant reservoir portion 123.

When the cutting-off of the product W is completed and the product W is recovered in the recovery container 120, the suction air generation means 103 stops the air suction (step S18).

Subsequently, simultaneously with the stopping of the air suction by the suction air generation means 103, compressed air is spouted toward the tip-end opening of the tube 101 from the air jet means (not shown) (step S19). The compressed air cleaning the inside of the product recovery tube 102 reaches the inside of the recovery container 120, raises the pressure of the inside of the container to open the discharge port 122a, and discharges the coolant (step S20).

A series of operation ends as described above (step S21). Thereafter, the above-described operation is repeated.

In this manner, for the product recovery apparatus of the present invention, it is possible to recover the product under remarkably simple control.

When a given number of products W are recovered by the product receiver 125, the container lower part 122 is removed from the container upper part 121, and the product W is taken out of the coolant reservoir portion 123 together with the product receiver 125. In this case, while the recovery container 120 is mounted on the machine tool, the product receiver 125 is simply removed, and then it is conveniently possible to take the product W out of the recovery container 120.

Since the suction air sucks not only the product W but also ambient air, a slight amount of the cut wastes R or the coolant is sucked into the recovery container 120. However, the product receiver 125 is formed of the perforated member. Therefore, when the product receiver 125 is taken out of the container lower part 122, the coolant or cut wastes R are separated from the product and pooled in an inner surface bottom of the container lower part 122.

The coolant drops into the coolant reservoir portion 123 and is pooled. When a given amount is exceeded, the coolant is discharged via the discharge port 122a. Moreover, the cut wastes R drop and are deposited in the coolant reservoir portion 123. When the coolant and the cut waste R are pooled to a certain degree, the container lower part 122 is removed from the container upper part 121 and the coolant reservoir portion 123 is washed and discarded.

[Second Embodiment]

A second embodiment of the present invention will next be described with reference to FIG. 4.

The second embodiment is different from the first embodiment only in a recovery container 220, and another constitution is the same as that of the first embodiment. Therefore, common parts and members are denoted with the same reference numerals, and detailed description thereof is omitted.

Figure 4:
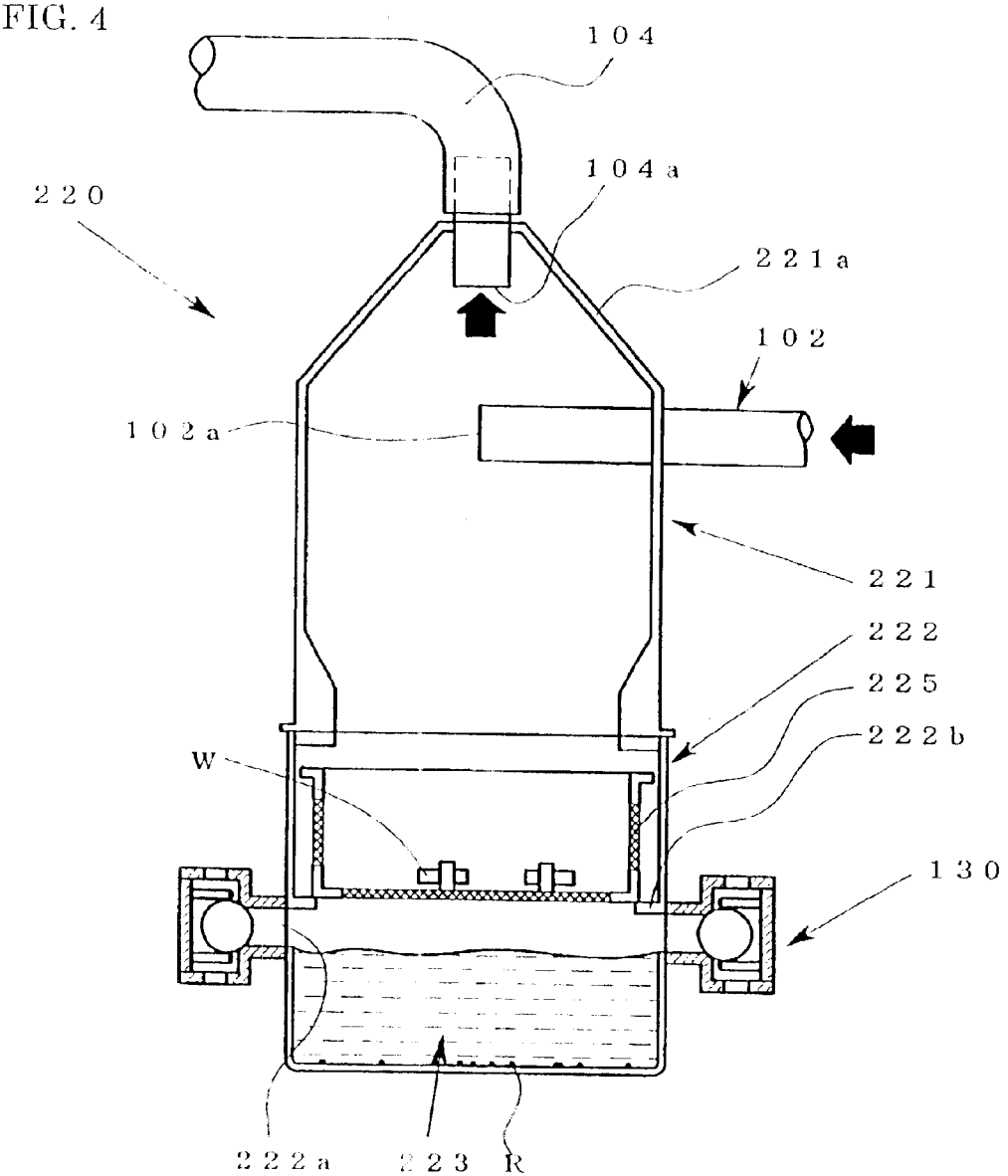
FIG. 4 is an explanatory view of the constitution of the recovery container according to a second embodiment of the product recovery apparatus of the present invention.

FIG. 4 is an explanatory view of the constitution of the recovery container according to the second embodiment of the product recovery apparatus of the present invention.

The recovery container 220 includes a container upper part 221 and container lower part 222, and the container upper part 221 includes a conical roof portion 221a. Moreover, the air suction tube 104 is connected to a vertex of the roof portion 221a, and the product recovery tube 102 is connected to the side surface of the container upper part 221.

A coolant reservoir portion 223 in which the coolant is pooled is formed in the container lower part 222, and a basket-shaped product receiver 225 is disposed above a discharge port 222a for discharging the coolant. The product W sucked in the recovery container 220 from the product recovery tube 102 by air drops and is recovered in the product receiver 225.

The coolant and cut wastes R sucked in the recovery container 220 by air are passed through the basket-shaped product receiver 225 and drop into the coolant reservoir portion 223. For the product recovery apparatus of this embodiment, the coolant is separated from the product W at a recovery time, and therefore the apparatus is effective for the product W which is not easily scratched or deformed.

[Third Embodiment]

A third embodiment of the present invention will next be described with reference to FIG. 5.

The third embodiment is different only in a recovery container 320, and another constitution is the same as that of the first embodiment. Therefore, the common parts and members are denoted with the same reference numerals, and the detailed description thereof is omitted.

Figure 5:
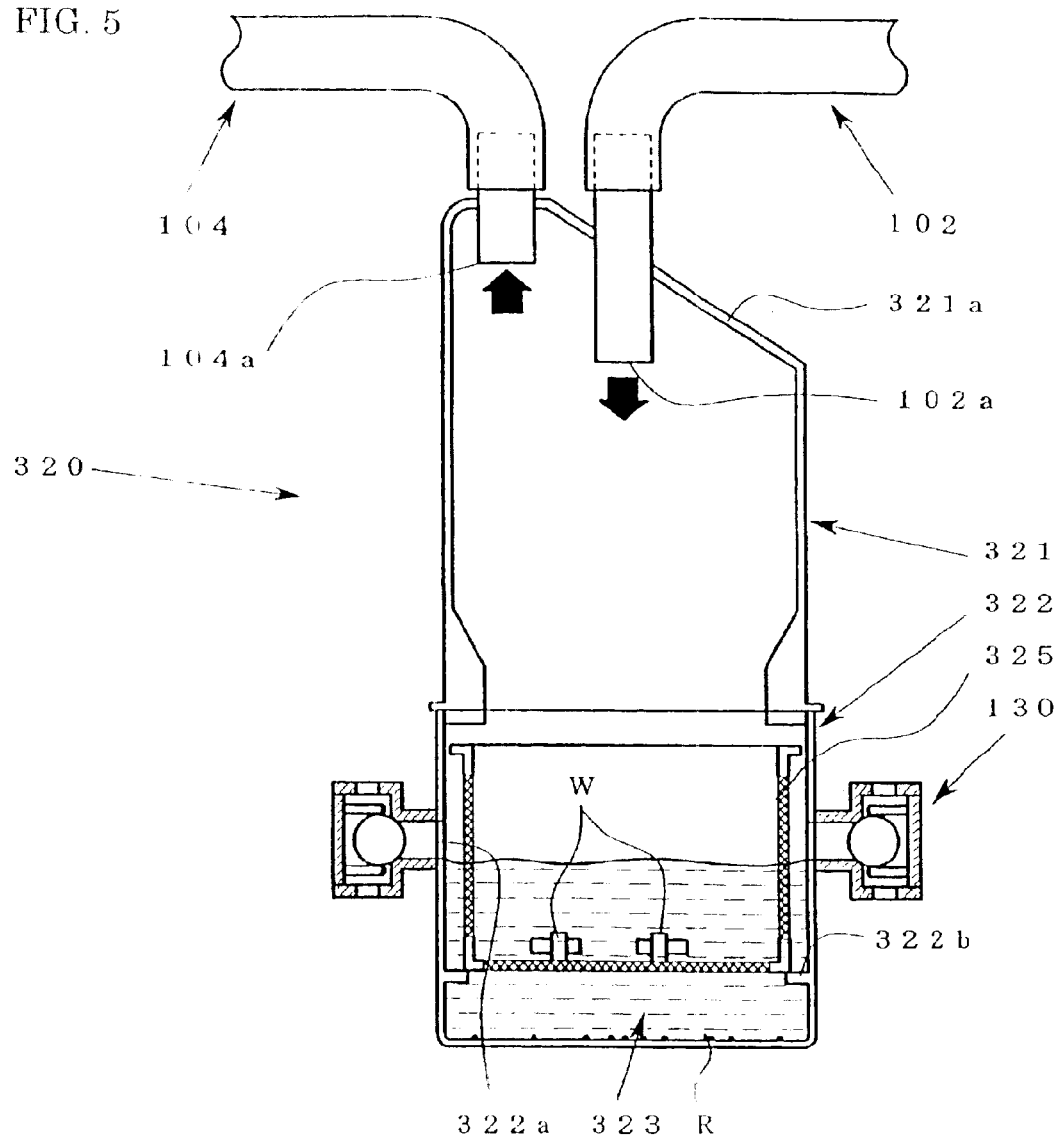
FIG. 5 is an explanatory view of the constitution of the recovery container according to a third embodiment of the product recovery apparatus of the present invention.

FIG. 5 is an explanatory view of the constitution of the recovery container according to the third embodiment of the product recovery apparatus of the present invention.

The recovery container 320 includes a container upper part 321 and container lower part 322, and the container upper part 321 includes a roof portion 321a inclined in one direction. Moreover, the air suction tube 104 is connected to the vertex of the roof portion 321a, and the product recovery tube 102 is connected to a middle portion of the roof portion 321a. Both the product recovery tube 102 and air suction tube 104 are connected to the recovery container 320 so that the tubes are directed in a vertical direction. Moreover, even in the embodiment, an opening 104a of the air suction tube 104 is positioned higher than an opening 102a of the product recovery tube 102.

A coolant reservoir portion 323 in which the coolant is pooled is formed in the container lower part 322, and a product receiver 325 is disposed in a slightly floated state from a bottom of the coolant reservoir portion 323.

The product W sucked in the recovery container 320 from the product recovery tube 102 by air drops and is recovered in the product receiver 325. The coolant and cut wastes R sucked in the recovery container 320 by air are passed through the basket-shaped product receiver 325 and drop into the coolant reservoir portion 323. The product W sucked into the recovery container 320 directly drops into the product receiver 325, but the impact is relaxed by the coolant of the coolant reservoir portion 323, and there is no possibility that the product W is scratched or deformed.

In the second and third embodiments shown in FIGS. 4 and 5, the product receivers 225, 325 are supported by protrusions 222b, 322b disposed in the container lower parts 222, 322 to form a precipitate space of the cut wastes R between the product receivers 225, 325 and container inner surface bottom. However, the space for precipitating the cut wastes R may also be formed by a concave portion formed in the container inner surface bottom or by legs attached to the product receivers 225, 325. Since the cut wastes R tend to gather in a middle of the container inner surface bottom, the space for precipitate may also be formed only in the vicinity of the middle portion.

It is to be noted that the functions in the product recovery apparatuses of the second and third embodiments described with reference to FIGS. 4 and 5 are the same as the function of the product recovery apparatus of the first embodiment described with reference to FIG. 6, and therefore the description thereof is omitted.

[Fourth Embodiment]

A fourth embodiment of the present invention will next be described with reference to FIG. 7.

Figure 7:
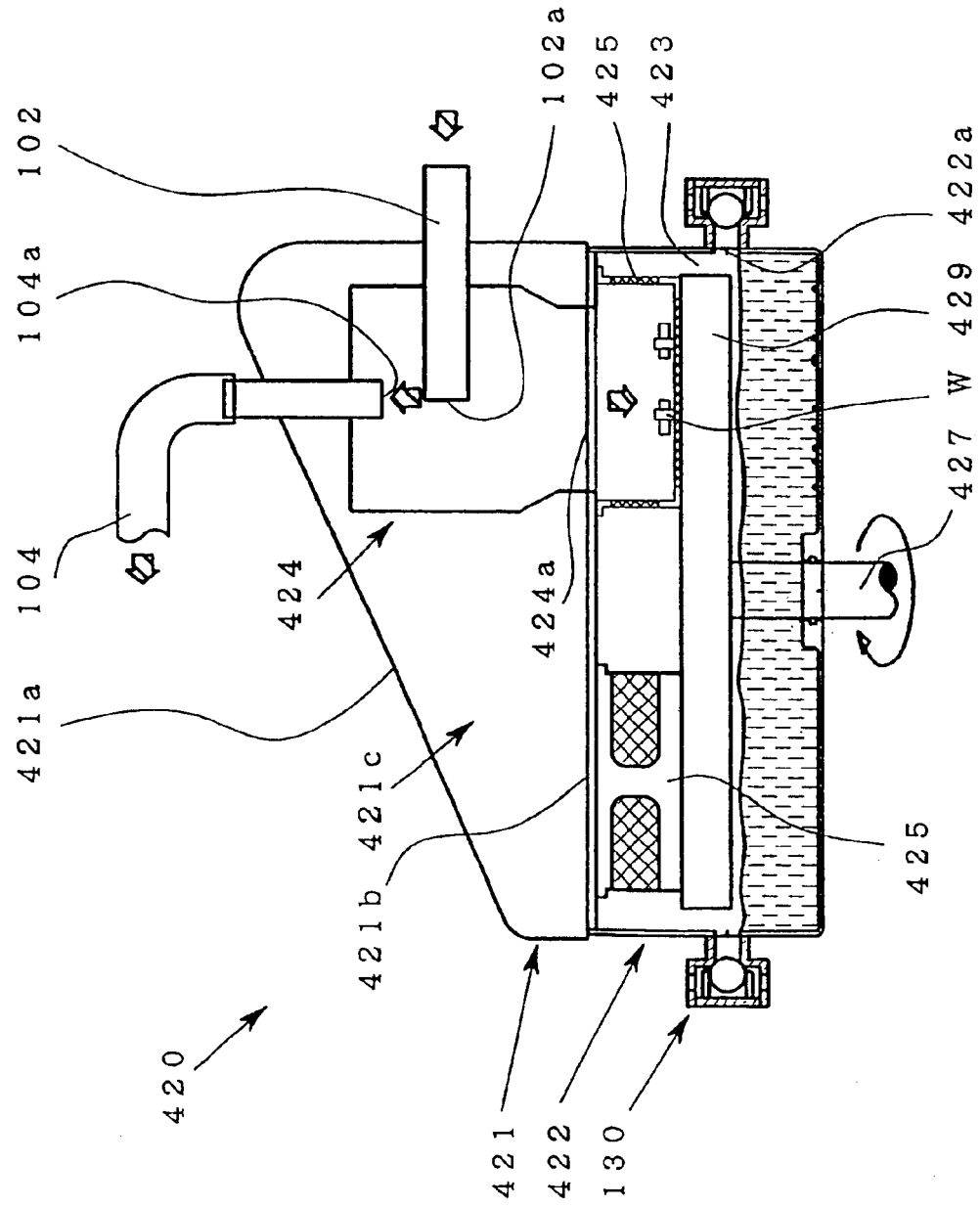
FIG. 7 is an explanatory view of the constitution of the recovery container according to a fourth embodiment of the product recovery apparatus of the present invention.

FIG. 7 is an explanatory view of the constitution of the recovery container according to the fourth embodiment of the product recovery apparatus of the present invention.

A recovery container 420 includes a container upper part 421 and container lower part 422.

The container upper part 421 includes a roof portion 421a inclined toward one side. An inner container 424 having a bottomed cylindrical shape is disposed in the container upper part 421, and the air suction tube 104 connected to the vicinity of the vertex of the roof portion 421a extends through an upper part of the inner container 424.

Moreover, the product recovery tube 102 extends through the side surface of the inner container 424 from the side surface of the container upper part 421. Even in the embodiment, in the inner container 424, the opening 104a of the air suction tube 104 is positioned above the opening 102a of the product recovery tube 102.

A shield plate 421b in which a hole is formed in a portion corresponding to an opening 424a of the inner container 424 is attached to the bottom of the container upper part 421 connected to the container lower part 422, and air of an ambient space portion 421c of the inner container 424 is prevented from flowing into the container lower part 422.

A coolant reservoir portion 423 in which the coolant is pooled is formed in the container lower part 422. Moreover, a rotary table 429 which is freely located/rotated by a rotation shaft 427 is disposed, and a basket-shaped product receiver 425 is held in a position higher than that of a discharge port 422a of the coolant. A plurality of product receivers 425 are laid on the rotary table 429, and the rotary table 429 performs location/rotation together with the rotation shaft 427, so that the product receivers 425 are positioned right under the inner container 424 in order.

A function of the product recovery apparatus constituted as described above and a recovery method of the product by the product recovery apparatus will be described with reference to FIG. 8.

Figure 8:
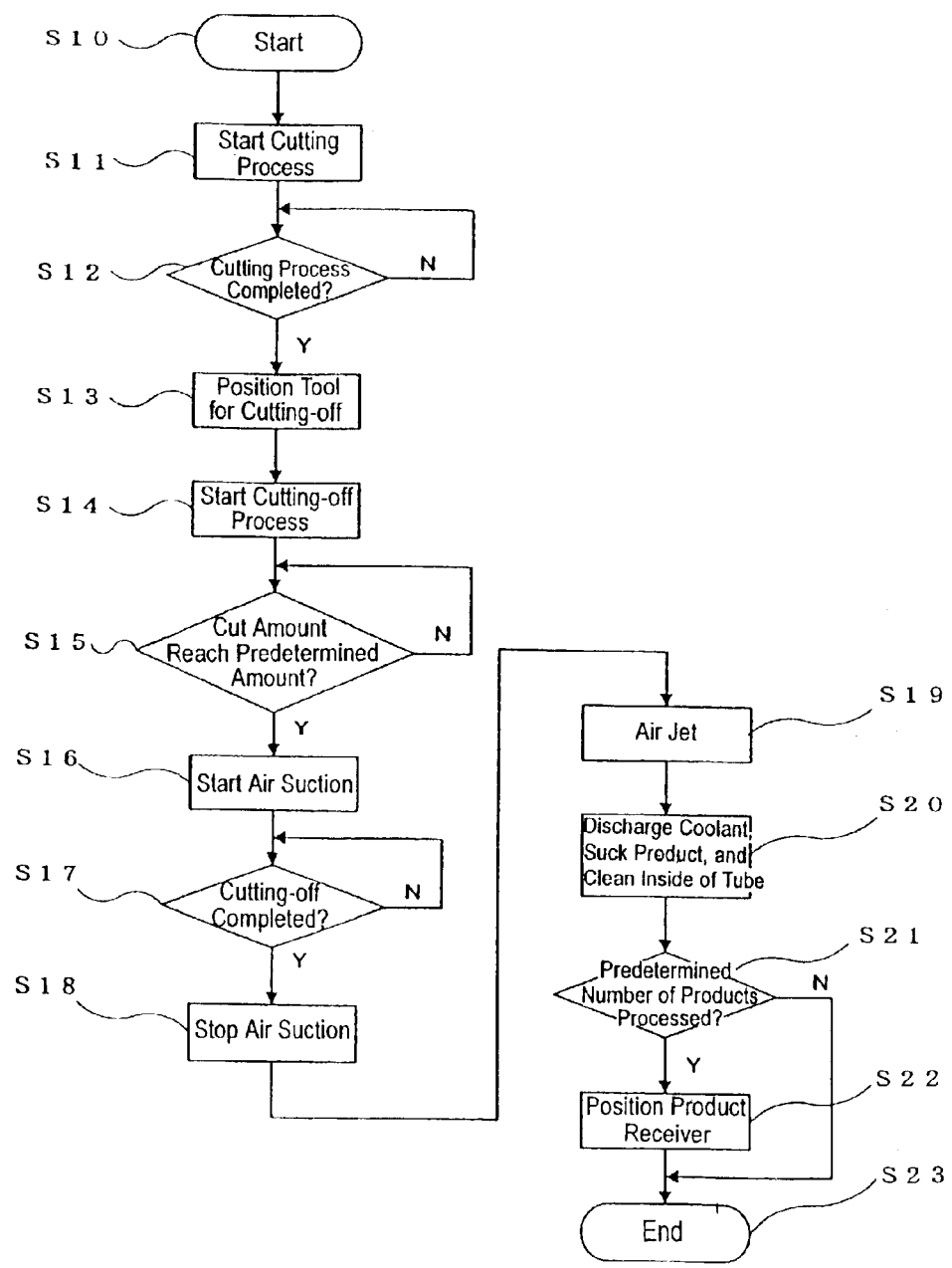
FIG. 8 is a flowchart showing the function of the product recovery apparatus of FIG. 7.

FIG. 8 is a flowchart showing the operation of the product recovery apparatus in one cycle from when the bar material B projected from the guide bush 6 by the predetermined length starts to be processed until the product W is recovered.

In the flowchart of FIG. 8, the steps S10 to S20 are the same as the steps of the above embodiment described with reference to FIG. 6, and therefore the detailed description is omitted here.

The number of products W recovered in one product receiver 425 can be judged from the number of processed products W counted by a control apparatus of the machine tool. For example, the number of processed products W in a change time of the previous product receiver 425 may be subtracted from the presently counted number. Moreover, when the number of products W in the product receiver 425 reaches a predetermined number (step S21), a driving member (not shown) is driven to rotate the rotary table 429, and the next product receiver 425 is positioned right under the inner container 424 (step S22).

It is to be noted that for timing of location control of the product receiver 425, control based on the processing end of the predetermined number of products by program is not limited, and the control can be performed at various timings such as a change of a processing object product, change of processing program, segmentation by dimension change of the processed product by wears of the tool, and trouble generation of the machine tool and tool such as detection of overload of rotation of the main shaft or feed in the axis line direction and tool automatic change by tool breakage.

A series of operation ends as described above (step S23). Thereafter, the above-described operation is repeated.

According to the embodiment, when a plurality of product receivers is located/rotated and successively changed, a large number of products can be recovered, and the embodiment is suitable for a long-time continuous unmanned operation. Moreover, it is possible to take the product recovered in one product receiver out of the machine tool without stopping the processing.

[Fifth Embodiment]

A fifth embodiment of the present invention will next be described with reference to FIGS. 9 and 10.

Figure 9:
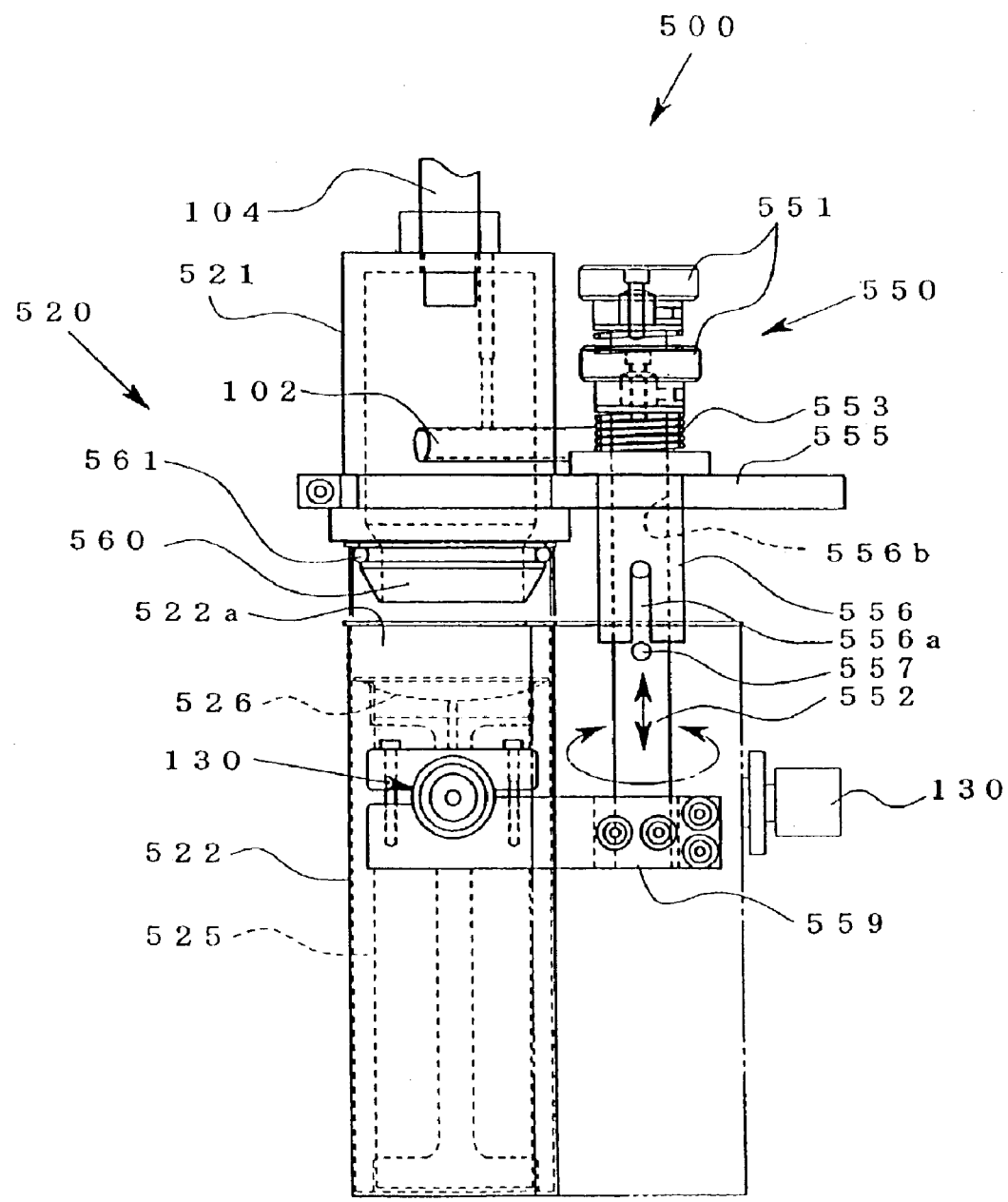
FIG. 9 is a schematic side view of the product recovery apparatus according to a fifth embodiment of the present invention.
Figure 10:
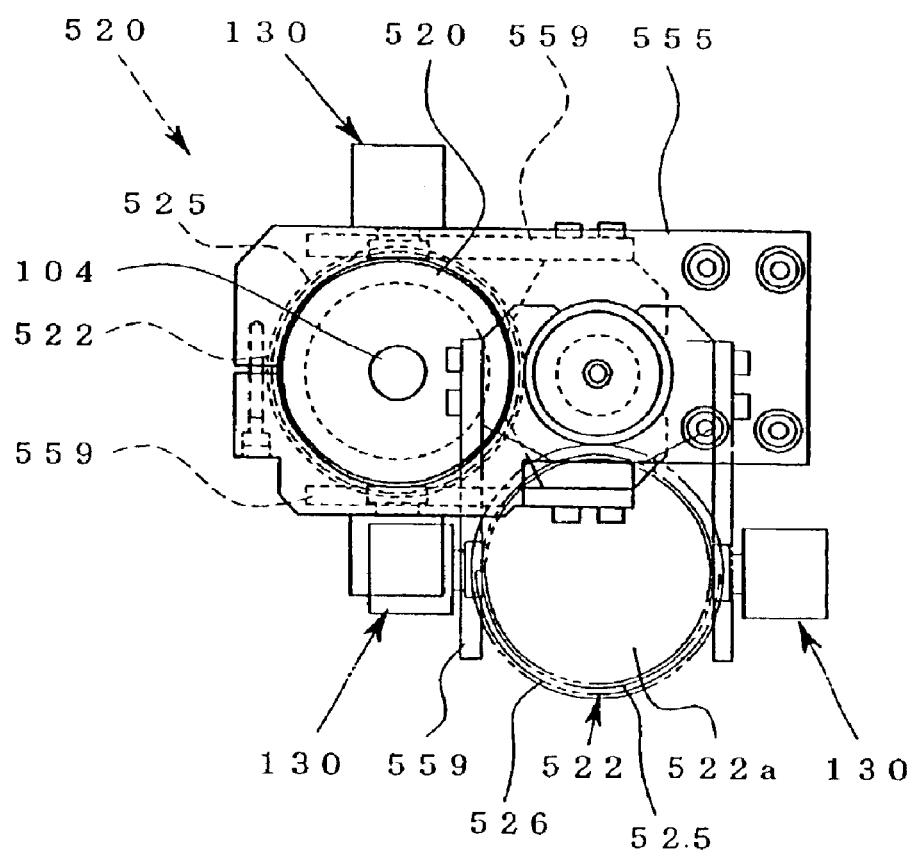
FIG. 10 is a plan view seen from a lower surface side of the product recovery apparatus of FIG. 9.

FIG. 9 is a schematic side view of the product recovery apparatus according to the fifth embodiment of the present invention, and FIG. 10 is a plan view seen from a lower surface side of the product recovery apparatus of FIG. 9.

In the embodiment a recovery container 520 is constituted of a container upper part 521 and container lower part 522 which can vertically be separated. Moreover, a product recovery apparatus 500 includes elevating/moving means 550 for lowering the container lower part 522 with respect to the container upper part 521 and moving the part in a horizontal direction so that the product is easily taken out.

The container upper part 521 is supported by a support plate 555 attached to a fixing portion of the base 4 (see FIG. 1) of the automatic lathe. The air suction tube 104 is connected to the vertex of the container upper part 521, and the product recovery tube 102 is connected to the side surface of the container upper part 521 below the air suction tube 104. Moreover, the valve 130 is disposed in the container lower part 522 similarly as the above embodiment.

The elevating/moving means 550 includes: a guide sleeve 556 supported by the support plate 555 in the vicinity of the container upper part 521; a shaft 552 inserted through a through hole 556b of a vertical direction of the guide sleeve 556; handles 551 disposed on the upper end of the shaft 552; and a spring 553, fitted in the shaft 552 between the handles 551 and support plate 555, for constantly urging the shaft 552 upwards.

The shaft 552 is guided through the through hole 556b of the guide sleeve 556, and freely moves upwards/downwards and rotates. The container lower part 522 is attached to the lower end of the shaft 552 via an attachment member 559. Therefore, the container lower part 522 freely moves upwards/downwards and rotates together with the shaft 552.

A groove 556a is formed in a vertical direction halfway to a height position from the lower end in an outer peripheral surface of the guide sleeve 556. Moreover, an engagement pin 557 engageable/disengageable with respect to the groove 556a is disposed in the outer peripheral surface of the shaft 552. When the handles 551 are operated to position the engagement pin 557 in the groove 556a, the container lower part 522 is positioned substantially right under the container upper part 521, and attached to the shaft 552. The attachment member 559 may be attached to the shaft 552 via bolts, so that an attachment position of the container lower part 522 with respect to the shaft 552 can finely be adjusted.

According to the above-described mode, while the handles 551 are operated, the engagement pin 557 is positioned in the groove 556a, the engagement pin 557 is engaged with the groove 556a, and the shaft 552 is raised. Then, the container lower part 522 accordingly moves upwards in a vertical direction toward the container upper part 521 and engages with the container upper part 521, while the movement (rotation) of the horizontal direction is regulated.

The container lower part 522 is pressed onto the container upper part 521 by an urging force of the spring 553. During the processing of the product, the container upper part 521 and container lower part 522 are firmly pressed onto each other by a pressure difference between the air pressure and outside air pressure in the recovery container 520 by the suction air. This prevents a disadvantage that the container lower part 522 is detached from the container upper part 521 during the operation of product recovery from occurring.

It is to be noted that an engagement convex portion 560 to be engaged in an opening 522a of the container lower part 522 may be formed in a lower end of the container upper part 521 engaged with the upper end of the container lower part 522. Moreover, in the outer peripheral surface of the engagement convex portion 560, an oil seal 561 may be disposed so as to closely contact an inner peripheral surface of the opening 522a, when engaged with the opening 522a of the container lower part 522. Thereby, air or coolant can be prevented from leaking from a gap between the engagement convex portion 560 and the inner peripheral surface of the opening 522a.

To remove the product from the container lower part 522, the air suction is stopped, the handles 551 are operated, and the container lower part 522 is pushed up against the urging force of the spring 553. Thereby, the container lower part 522 is separated from the container upper part 521. Moreover, when the engagement pin 557 is detached from the lower end of the groove 556a, the shaft 552 is rotated, and the container lower part 522 is moved in the horizontal direction with respect to the container upper part 521. Thereby, as shown by a virtual line in the plan view of FIG. 10, the container lower part 522 is brought in an offset state in the horizontal direction from the container upper part 521, and the product is easily taken out.

To further easily remove the product from the container lower part 522, a basket-shaped product receiver 525 may be inserted into the container lower part 522. For example, a string-shaped handle 526 having flexibility may be attached to the upper end of the product receiver 525. Thereby, the product recovered in the container lower part 522 can be taken out at once, and the coolant pooled in the container lower part 522 can easily be separated from the product.

It is to be noted that the groove 556a linearly extending in the vertical direction has been described above. However, when a middle portion of the groove 556a is bent in an oblique direction, the container lower part 522 is lowered, and can be moved with respect to the container upper part 521 in the horizontal direction.

The product recovery apparatus 500 constituted as described above may be disposed in the processing chamber of the automatic lathe, but may also be disposed independently of the automatic lathe outside the automatic lathe.

Figure 11:
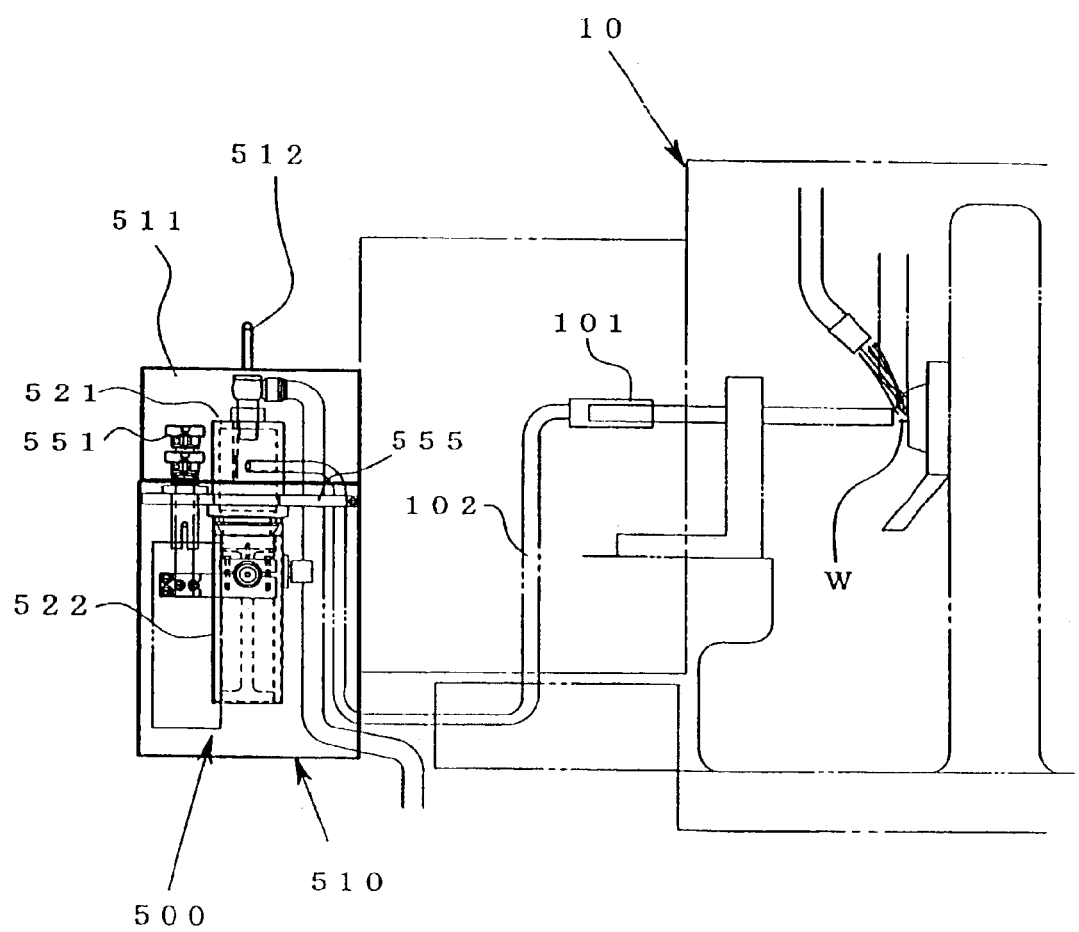
FIG. 11 is a diagram showing one example in which the product recovery apparatus of FIG. 9 is disposed outside the automatic lathe.

FIG. 11 is a diagram showing one example in which the product recovery apparatus 500 is disposed outside the automatic lathe.

As shown in FIG. 11, a case 510 is detachably attached to the outside of a main body cover 10 for shielding the processing chamber of the automatic lathe, and the product recovery apparatus 500 is contained in the case 510.

An openable/closable lid 511 is disposed on the upper part of the case 510, and a handle 512 is disposed on the lid 511 so that the product recovery apparatus 500 can be carried together with the case 510.

Moreover, the support plate 555 is fixed to the inner peripheral surface of the case 510, and the recovery container 520 is attached to the support plate 555. The product recovery tube 102 is passed through the hole formed in the lower part of the case 510 from the main body cover 10 of the automatic lathe, and connected to the side surface of the container upper part 521. Moreover, the air suction tube 104 is passed through the hole and connected to the vertex of the container upper part 521. Therefore, the product W processed in the processing chamber of the automatic lathe is recovered in the container lower part 522 outside the main body cover 10 via the tube 101 and product recovery tube 102 by the suction air.

When the product W is taken out, the lid 511 of the case 510 is opened, the handle 551 is operated in the above-described procedure, and the container upper part 521 is separated from the container lower part 522.

Since the product recovery apparatus of the present invention can be formed to be small and compact in this manner, it is possible to dispose the apparatus not only in the processing chamber of the machine tool such as the automatic lathe but also in arbitrary appropriate positions such as the outside of the machine tool.

[Sixth Embodiment]

A sixth embodiment of the present invention will next be described with reference to FIGS. 12 and 13.

Figure 12:
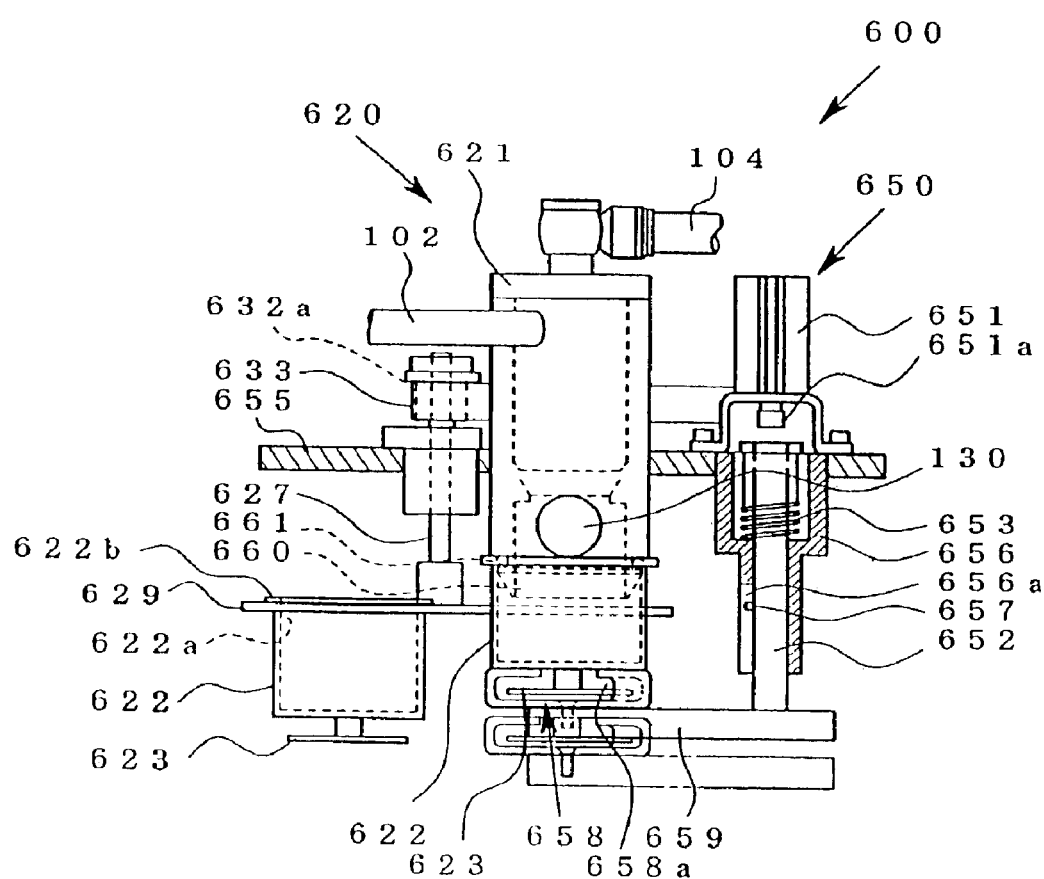
FIG. 12 is a schematic side view of the product recovery apparatus according to a sixth embodiment of the present invention.
Figure 13:
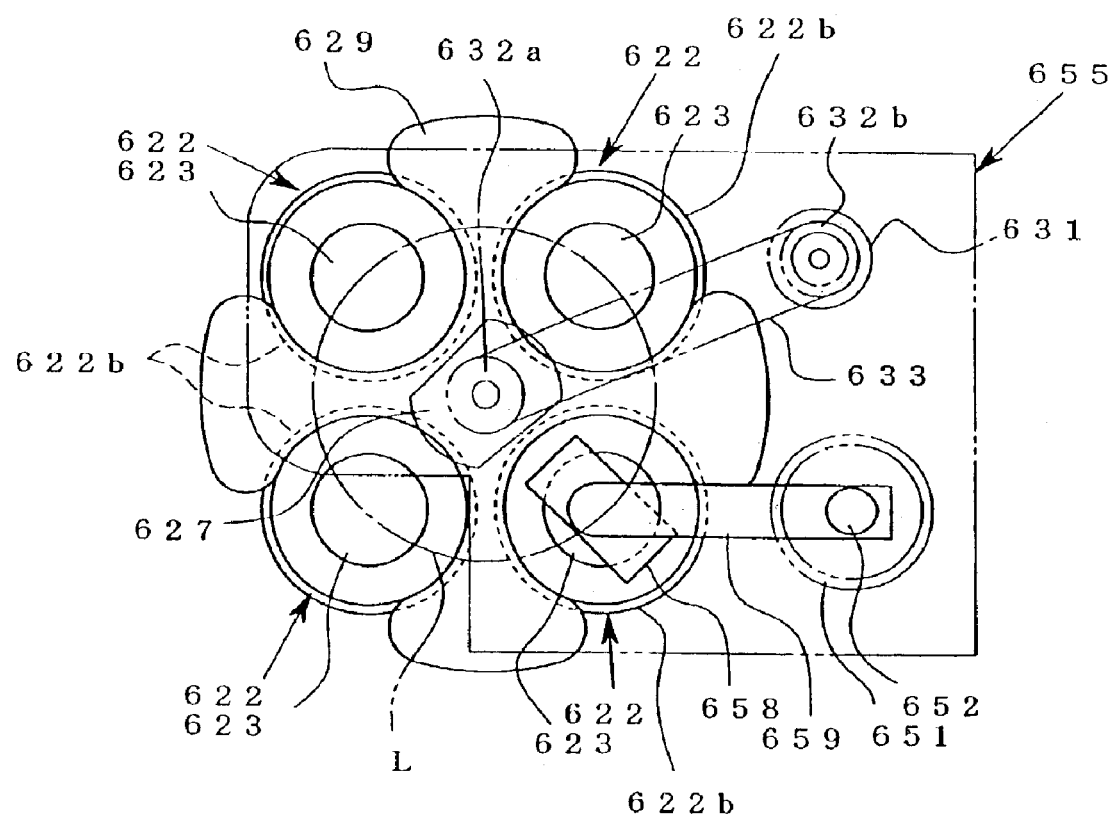
FIG. 13 is a plan view seen from the lower surface side of the product recovery apparatus of FIG. 12.

FIG. 12 is a schematic side view of the product recovery apparatus according to the sixth embodiment of the present invention, and FIG. 13 is a plan view seen from the lower surface side of the product recovery apparatus of FIG. 12.

For a product recovery apparatus 600 of the embodiment, similarly as the product recovery apparatus 400 of the fourth embodiment, a plurality of product receivers is located/rotated and successively changed, thereby a large number of products can be recovered, and the apparatus is suitable for a long-time continuous unmanned operation. Moreover, the product recovered in one product receiver can be taken out of the apparatus without stopping the processing.

The product recovery apparatus 600 of the sixth embodiment is different from the product recovery apparatus 400 of the fourth embodiment in that a plurality of product receivers 425 is disposed inside the container lower part 422 in the product recovery apparatus 400 of the fourth embodiment and the product receiver 425 is located/rotated inside the container lower part 422 and that the product recovery apparatus 600 of the sixth embodiment includes a plurality of container lower parts 622 detachable from a container upper part 621 and the container lower parts 622 are successively located/rotated to recover the product W.

As shown in FIG. 12, a recovery container 620 includes the container upper part 621 and container lower part 622 which can vertically be separated. The container upper part 621 is supported by a support plate 655 attached to the fixing portion such as the base of the automatic lathe, and the container lower part 622 is disposed such that the part 622 can move upwards/downwards and can be located/rotated with respect to the container upper part 621.

Similarly as the above embodiment, the product recovery tube 102 is connected to the side surface of the container upper part 621, and the air suction tube 104 is connected to the vertex of the container upper part 621. Moreover, in this embodiment, the valve 130 for recovering the coolant is disposed in the lower end of the container upper part 621.

A rotation shaft 627 is disposed in the vicinity of the container upper part 621 in the support plate 655. Moreover, a rotary table 629 for locating/rotating the container lower part 622 is attached to the lower end of the rotation shaft 627.

A plurality of (four in this embodiment) holder holes 629a is formed in the rotary table 629, and the container lower part 622 is inserted and held in each holder hole 629a. That is, a flange portion 622b jutting outside is formed in a peripheral edge of an opening 622a of the container lower part 622, the flange portion 622b is engaged with the hole peripheral edge of the holder hole 629a of the rotary table 629, and thereby the container lower part 622 is attachably/detachably held by the rotary table 629.

Location/rotation means for locating/rotating the rotary table 629 includes: a motor 631 attached to the support plate 655; a driving-side pulley 632b attached to the rotation shaft of the motor 631; a follower-side pulley 632a attached to the rotation shaft 627; and a timing belt 633 wound around these pulleys 632a, 632b.

When the motor 631 drives and rotates the rotation shaft by a predetermined angle, the rotation is transmitted to the rotation shaft 627 and rotary table 629 via the driving-side pulley 632b, timing belt 633, and follower-side pulley 632a.

Moreover, a cylinder 651 is attached to the vicinity of the container upper part 621 via brackets and directed downwards in the support plate 655. Moreover, a guide sleeve 656 is attached to the support plate 655, including a through hole concentric with a piston rod 651a of the cylinder 651 which can move forwards and backwards. A shaft 652 which can move upwards/downwards is inserted into the guide sleeve 656, and a head of the shaft 652 is disposed opposite to the piston rod 651a. The shaft 652 is constantly urged upwards by a spring 653 fitted into a large-diameter hole of the guide sleeve 656. Moreover, in the outer peripheral surface of the guide sleeve 656, a guide groove 656a is formed in the axis line direction from the lower end, and an engagement pin 657 formed on the side surface of the shaft 652 is constantly engaged with the guide groove 656a. The shaft 652 is regulated not to rotate, when the engagement pin 657 is constantly engaged with the guide groove 656a.

An arm-shaped attachment member 659 extending in the horizontal direction is attached to the lower end of the shaft 652, and an engagement member 658 including an engagement groove 658a is attached to the tip end of the shaft 652. On the other hand, a disc-shaped engaged portion 623 which can be engaged with the engagement groove 658a of the engagement member 658 is disposed in the bottom portion of the container lower part 622.

The engagement groove 658a of the engagement member 658 is disposed on a movement path L of the engaged portion 623 with the location/rotation of the container lower part 622, and the engaged portion 623 is inserted into the engagement groove 658a, when the container lower part 622 moves to the position right under the container upper part 621.

The recovery procedure of the product by the product recovery apparatus constituted as described above will next be described. It is to be noted that the main procedure including the start of the processing of the product and the location/rotation of the container lower part 622 is substantially the same as the procedure of FIG. 8 described in the fourth embodiment, and therefore the detailed description thereof is omitted.

Prior to the location/rotation of the rotary table 629, the cylinder 651 is driven to push down the shaft 652 with the piston rod 651a. Thereby, the engagement groove 658a of the engagement member 658 is positioned on the movement path L of the engaged portion 623.

Subsequently, the motor 631 is driven to locate/rotate the rotary table 629, and the container lower part 622 is located in the position right under the container upper part 621. Thereby, the engaged portion 623 enters the engagement groove 658a, and a state in which engagement member 658 can be engaged with the engaged portion 623 is obtained.

When the cylinder 651 is driven, and the piston rod 651a is contracted and retreated in this state, the shaft 652 moves upwards by the urging force of the spring 653, and the attachment member 659 pushes upwards the container lower part 622. Moreover, a fit convex portion 660 of the container upper part 621 is inserted into the opening 622a of the container lower part 622, and the container lower part 622 is fitted into the container upper part 621 in a sealed state by an oil seal 661.

Thereafter, the air suction is started, and the processing of the product is started. Even in this embodiment, similarly as the fifth embodiment, the container lower part 622 is prevented from being detached from the container upper part 621 during the recovery of the product by the air pressure difference by the air suction.

The number of products W recovered in one container lower part 622 can be judged from the number of processed products W counted by the control apparatus of the machine tool. When the number of products W in the container lower part 622 reaches the predetermined number, the cylinder 651 is driven to move downwards the container lower part 622. The container lower part 622 is forcibly pushed downwards, when the engagement member 658 engages with the engaged portion 623. Thereafter, in the above-described procedure the rotary table 629 is located/rotated, and the next container lower part 622 is positioned right under the container upper part 621.

The product W can easily be taken out of the product recovery apparatus 600, when the container lower part 622 is detached from the rotary table 629. Of course, the basket-shaped product receiver may be disposed in each of the container lower parts 622 similarly as the above-described embodiment, and the product W may be taken out of the container lower part 622 together with the product receiver.

It is to be noted that for the timing of the location control of the container lower part 622, as described also in the fourth embodiment, the control based on the processing end of the predetermined number of products by the program is not limited. The control can be performed in various timings such as the change of the processing object product, change of processing program, segmentation by dimension change of the processed product by the wears of the tool, and trouble generation of the machine tool and tool such as detection of overload of rotation of the main shaft or feed in the axis line direction and tool automatic change by tool breakage.

[Seventh Embodiment]

A seventh embodiment of the present invention will next be described with reference to FIGS. 14(a) and 14(b).

Figure 14A:
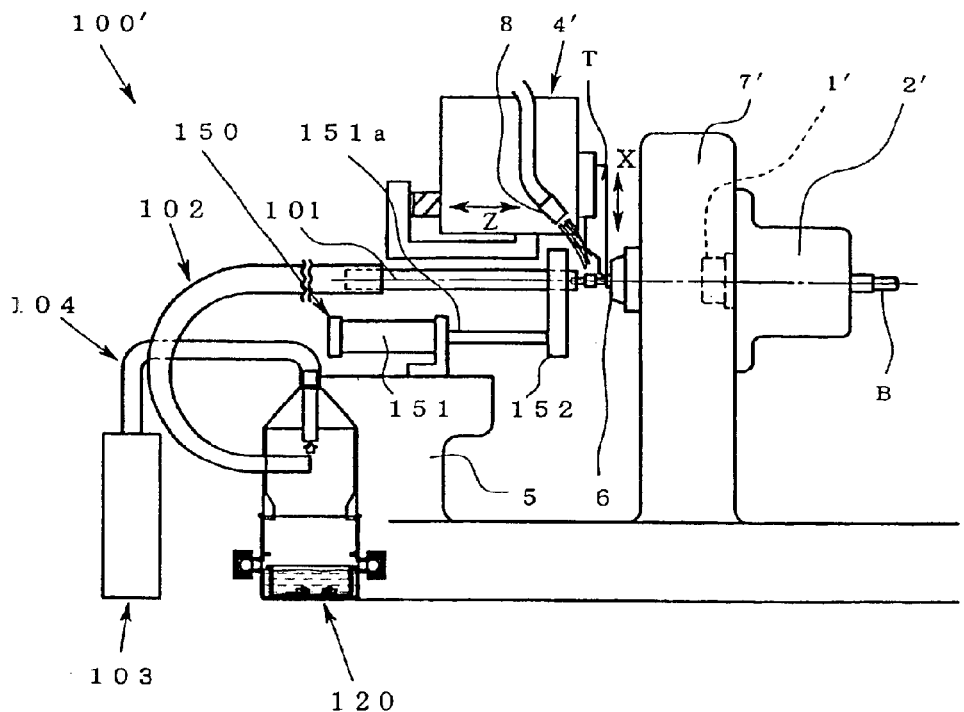
FIGS. 14(a) and 14(b) are schematic views of the product recovery apparatus according to a seventh embodiment of the present invention.
Figure 14B:
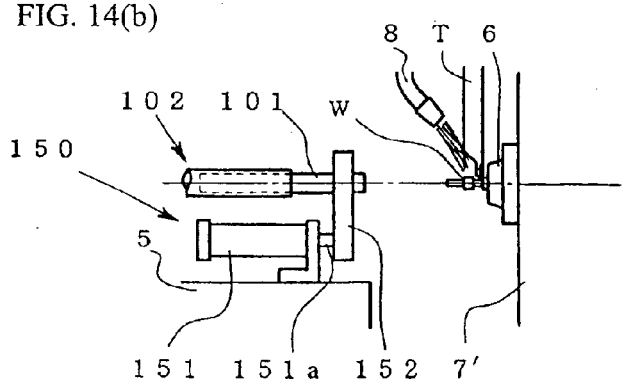

FIGS. 14(a) and 14(b) are schematic views of the product recovery apparatus according to the seventh embodiment of the present invention.

The same members and portions as those of the product recovery apparatus 100 of the first embodiment shown in FIG. 1 are denoted with the same reference numerals, and the detailed description thereof is omitted.

The present invention is not limited to the main shaft movement type of automatic lathe as described in the first embodiment, and can also be applied to a main shaft fixed type of automatic lathe as shown in FIGS. 14(a) and 14(b).

In the automatic lathe shown in FIGS. 14(a) and 14(b), a head stock 2' is attached to a column 7', and a main shaft 1' is rotatably supported by the head stock 2'. Moreover, a tool rest 4' which can move in X and Z directions with respect to the main shaft 1' is disposed, and a plurality of tools T such as the cutting tool and cut-off tool is mounted on the tool rest 4' so that the tools are freely located.

In the automatic lathe shown in FIGS. 14(a) and 14(b), a tube 101 freely movers forwards/backwards in the Z-axis direction, and a driving portion 150 for moving the tube 101 forwards/backwards may be disposed.

The driving portion 150 includes a cylinder 151 attached to the fixing portion of the machine tool such as the table 5, and a support member 152 attached to a stretchable piston rod 151a of the cylinder 151. The tube 101 is attached to the support-member 152, and moves forwards/backwards in the Z-direction on the main shaft axis line together with the forward/backward movement of the piston rod 151a by the driving of the cylinder 151.

In this embodiment, simultaneously with the location of the tool for cutting-off (see the step S13 of FIG. 6), the cylinder 151 is driven to extend the piston rod 151a, and the tip end of the product W is inserted into the hole of the tube 101 as shown in FIG. 14(a). In this case, the tip end of the product W in the cutting-off processing can be inhibited from swinging. Moreover, as shown in FIG. 14(b), after the product W cut from the bar material B is recovered, the suction air generation means 103 is stopped (see the step S18 of FIG. 6) and the piston rod 151a is contracted/retreated.

Figure 15:
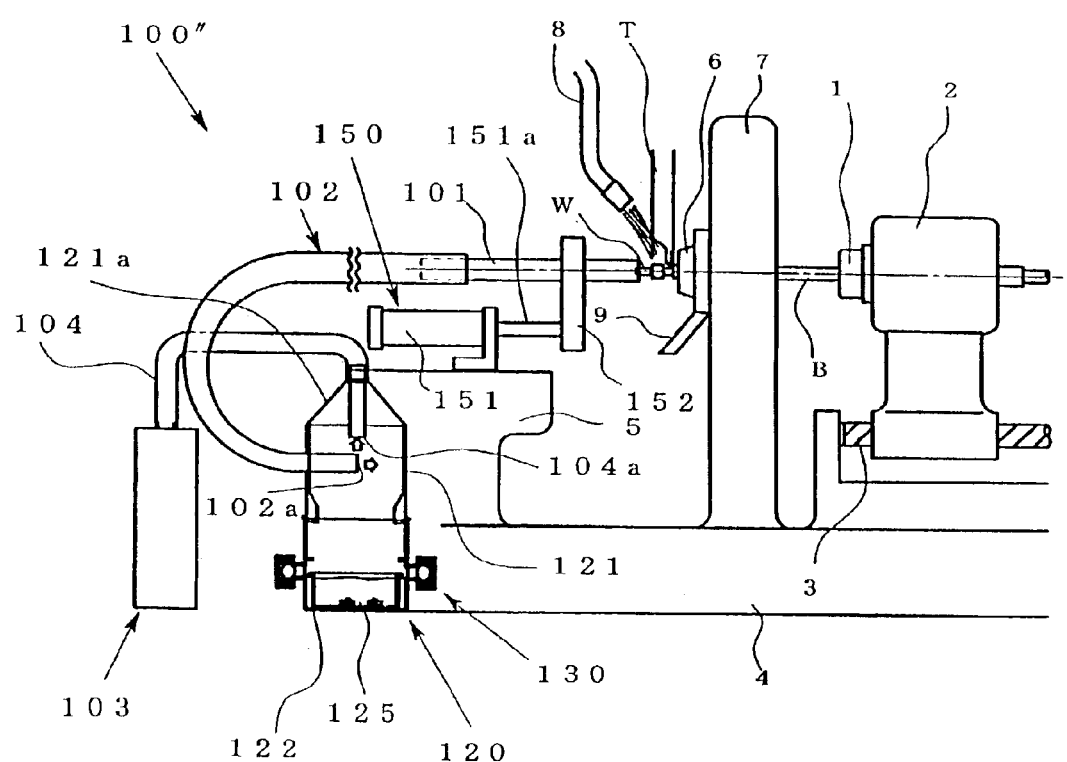
FIG. 15 is a schematic view of a main part of a machine tool according to an embodiment in which the product recovery apparatus of the present invention is disposed in a main shaft movement type of machine tool.
Figure 16:
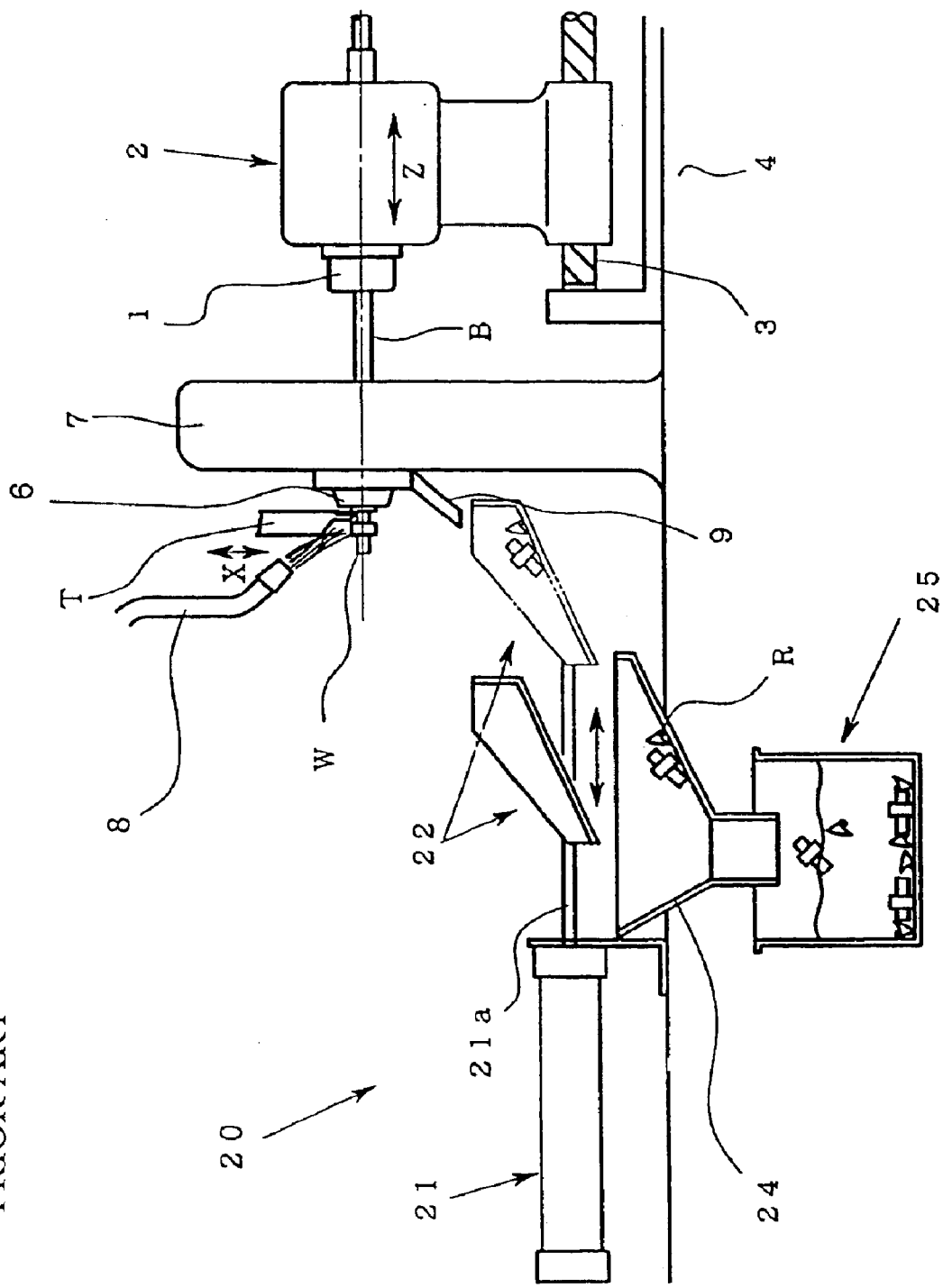
FIG. 16 is a schematic view of a main part of the automatic lathe including the product recovery apparatus according to a conventional example of the present invention.
Figure 17:
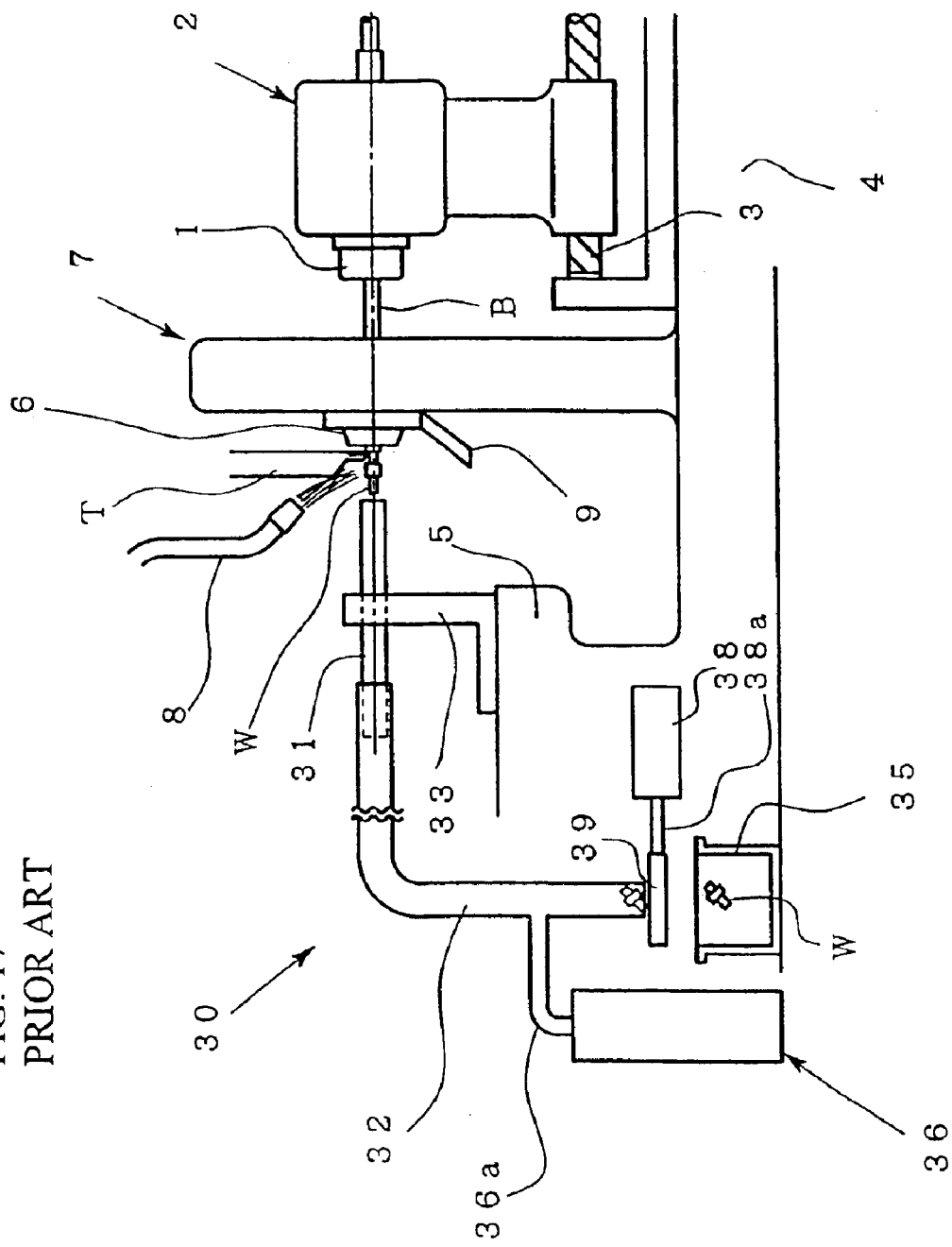
FIG. 17 is a schematic view of the product recovery apparatus disclosed in Japanese Patent Application Laid-Open No. 1997-94704 according to the conventional example of the present invention.

It is to be noted that the above-described driving portion 150 may also be disposed in the main shaft movement type of machine tool. FIG. 15 is a schematic view showing that the driving portion 150 is disposed in the product recovery apparatus of the main shaft moving type of machine tool.

In this case, during the processing of the product W, the tube 101 can be retracted in the position apart from the processed portion. Therefore, there are advantages that the coolant and cut wastes R can be prevented from entering the hole of the tube 101 and that the amounts of the coolant and cut wastes R sucked together with the product W into the recovery container 120 at the air suction time can further be reduced.

When the tube 101 is in the retreated position, the tip end of the tube 101 is covered. When the tube 101 moves on the main shaft 1 side, the tip end of the tube 101 is projected from the cover. In this constitution, the coolant and cut wastes R in the processing of the product W can be prevented from entering the hole of the tube 101.

Preferred embodiments of the present invention have been described, but the present invention is not limited to the above-described embodiments.

For example, the automatic lathe has been illustrated as one example of the machine tool to which the present invention is applied, but the present invention can be applied to not only the automatic lathe but also all types of machine tools such as another type of lathe and a grinding machine as long as the machine tool continuously processes the product from the material. Moreover, the present invention can also be applied to all types of machine tools such as a vertical, lateral, main shaft fixed, and main shaft moving types and to any type of machine tool including a turret tool rest and comb teeth-shaped tool rest. Furthermore, the present invention can be applied to machines other than the machine tools for performing cutting and grinding processing, such as a machine for press processing, and a machine for performing pressure welding processing to pressure-weld a plurality of parts into one product.

Moreover, also for the automatic lathe, the present invention may applied to any type including the comb teeth-shaped tool rest or turret tool rest. Moreover, the main shaft axis line is not limited to a lateral type of the horizontal direction, and the main shaft axis line may be of a vertical type of the vertical direction.

Furthermore, the vacuum pump has been described as the example of the suction air generation means. However, as long as the suction air can be generated, for example, compressed air is passed toward the outside air from the air suction tube at high-speed to lower the pressure in the recovery container, and thereby air may be sucked from the product supply tube.

Additionally, the tube 101 formed separately from the product recovery tube 102 and attached to the tip end of the product recovery tube 102 has been described, but one portion of the tip end of the product recovery tube 102 may linearly be formed to form a tubular portion.

Moreover, when the recovery container can be separated into the container upper and lower parts as in the fifth and sixth embodiments, either the container upper part or the container lower part may freely move upwards/downwards or move in the transverse direction, or both may freely move upwards/downwards or move in the transverse direction. Furthermore, in this case, the elevator means for moving the container upper or lower part upwards/downwards is not limited to the above-described means, and other elevator means may also be used using a cam or ball screw/nut mechanism, linear motor, and the like.

Additionally, the locating/driving means for a plurality of container lower parts and product receivers as in the fourth and sixth embodiments is not limited to the above-described means, and other driving means such as a belt conveyor can be used, as long as the container lower parts and product receivers can be located in the predetermined positions.

Moreover, the fifth and sixth embodiments are constituted to forcibly push downwards the container lower part by the cylinder, but the present invention is not limited to this constitution as long as it is possible to forcibly separate the container upper part from the container lower part. For example, elastic means such as the spring may be disposed between the container upper and lower parts, and the container lower part may also be pushed downwards by a snapping force of this elastic means.

Since the present invention is constituted as described above, the product cut from the material such as the bar material can be recovered by the air suction in the form separated from the cut wastes and coolant. Moreover, since the recovery container is sealed, the recovered product is prevented from being flied/scattered outside the recovery container, and the recovery rate of the products can be enhanced.

Moreover, since the product recovery apparatus can be miniaturized and the recovery container is sealed, it is possible to dispose the recovery container in the vicinity of the portion to be processed or in the processing chamber.

Furthermore, according to the product recovery apparatus and method of the present invention, it is possible to recover the product under remarkably simple control.

INDUSTRIAL USABILITY

The present invention can be applied to all types of processing machines for removing and recovering processed products from a main shaft chuck and table. Moreover, for the products which can be recovered by the apparatus and method of the present invention, various product can be objects, when strength of suction air is changed. Particularly, the present invention is suitable for the recovery of small-sized and light-weight products such as clock components and components of portable electronic apparatuses.

What is claimed is:

1. A product recovery apparatus which recovers a product from a machine tool for processing a material held by material hold means to produce the product, comprising:
   a product recovery tube for receiving the product;
   suction air generation means for bringing the product into the product recovery tube by suction of air; and
   a recovery container of the product disposed between the suction air generation means and the product recovery tube, said recovery container including a coolant reservoir portion in which a coolant is pooled.

2. The product recovery apparatus according to claim 1, wherein the recovery container has a sealable structure.

3. The product recovery apparatus according to claim 1, wherein the coolant reservoir portion includes a discharge port of the coolant, and a valve for closing the discharge port at a suction time of air by the suction air generation means.

4. The product recovery apparatus according to claim 3, wherein the discharge port is formed in a side surface of the coolant reservoir portion, the valve includes a valve body for opening/closing the discharge port and a main body for movably holding the valve body, the valve body closes the discharge port when pressure inside the recovery container becomes lower than outside air pressure by the suction of air, and the valve body opens the discharge port by the coolant of the coolant reservoir portion, when the pressure in the recovery container becomes the same as or higher than the outside air pressure.

5. The product recovery apparatus according to claim 1, wherein the product recovered by the product recovery tube is allowed to drop into the coolant pooled in the coolant reservoir portion.

6. The product recovery apparatus according to claim 1, wherein a product receiver for receiving the product is disposed inside the recovery container, and the product receiver can be taken out of the recovery container.

7. The product recovery apparatus according to claim 6, wherein the product receiver is formed of a perforated via which small cut wastes can flow out from the product.

8. The product recovery apparatus according to claim 6, wherein at least one portion of a bottom of the product receiver is disposed apart from a bottom of the recovery container, and in cut wastes and dusts sucked together with the product, cut wastes and dusts smaller than the product are separated from the product, and precipitated on the bottom of the recovery container.

9. The product recovery apparatus according to claim 1, wherein an inside of the recovery container is formed in a cylindrical shape, and the product recovery tube is disposed so that the product sucked via the product recovery tube collides with an inner wall of the recovery container substantially from a tangent direction.

10. The product recovery apparatus according to claim 1, wherein an air suction tube and the product recovery tube are connected to the recovery container so that an opening of the air suction tube connected to the suction air generation means is positioned above an opening of the product recovery tube in the recovery container.

11. The product recovery apparatus according to claim 1, wherein a roof portion of the recovery container is formed in an inclined shape.

12. The product recovery apparatus according to claim 10, wherein a roof portion of the recovery container is formed in an inclined shape, and the air suction tube is connected to a vertex side of the roof portion.

13. The product recovery apparatus according to claim 1, wherein the product recovery tube includes a tubular portion into which one portion of the product held by the material hold means is inserted at a tip end thereof.

14. The product recovery apparatus according to claim 13, wherein at least one portion of the tubular portion is formed as a guide for inhibiting a free end of the product held by the material hold means from swinging.

15. The product recovery apparatus according to claim 13, wherein the tubular portion is disposed in such a manner that the tubular portion can move forwards/backwards with respect to the material.

16. The product recovery apparatus according to claim 15, further comprising driving means for moving the tubular portion forwards/backwards so that the one portion of the product held by the material hold means is inserted into the tubular portion before the suction for receiving the product is performed.

17. The product recovery apparatus according to claim 13, wherein the product is obtained by processing the material supplied to the material hold means from a front side, the tubular portion is driven by the driving means in a timing when the product is discharged from the material hold means to approach the product, and the one portion of the product is inserted into the tubular portion.

18. The product recovery apparatus according to claim 13, wherein the product is obtained by subjecting a bar material supplied to the material hold means from a back side to processing including cutting-off of the product from the bar material, the tubular portion is driven by the driving means simultaneously with cutting-off processing for cutting the product from the bar material or in a predetermined timing after the cutting-off processing starts to approach the product, and the one portion of the product is inserted into the tubular portion.

19. The product recovery apparatus according to claim 1, wherein the recovery container is formed of a container upper part and container lower part, and the container upper part is connected to the air suction tube and product recovery tube, so that the product is recovered in the container lower part.

20. The product recovery apparatus according to claim 19, further comprising elevator means for relatively moving up and down the container lower part or container upper part, and movement means for relatively moving the container lower part or container upper part in a transverse direction, said container lower part and container upper part being formed to be detachable from each other.

21. The product recovery apparatus according to claim 20, wherein said container lower part includes a plurality of container lower portions, said apparatus further comprising location means for relatively moving the container lower portions or container upper part and locating one of the container lower portions under the container upper part, said elevator means relatively moving up and down the container lower portions or container upper part.

22. The product recovery apparatus according to claim 21, wherein the elevator means includes a portion to be engaged disposed in the container lower part, an engagement portion which is disposed on a movement path of the portion to be engaged and which can be engaged with the portion to be engaged when one of the container lower portions is located at a predetermined position, and a driving mechanism for moving up or down the container lower portion in a state in which the engagement portion is engaged with the portion to be engaged .

23. The product recovery apparatus according to claim 1, further comprising: at least one of a plurality of the coolant reservoir portions and product receivers, and location means for moving and locating the at least one of the coolant reservoir portions portion and the product receivers into predetermined position.

24. The product recovery apparatus according to claim 1, wherein the suction air generation means is started at a beginning of cutting-off processing of the product, and is stopped after the cut-off product is recovered.

25. A product recovery method of relatively moving a tool and material to perform processing, and recovering a processed product after processing ends, comprising the steps of:
positioning a product recovery tube for recovering the product by suction air opposite to the product being processed;
disposing a recovery container of the product between suction air generation means for generating suction air and the product recovery tube;
inserting one portion of the product into the product recovery tube, when processing is performed to release the product from material hold means or to cut the product from the material;
driving the suction air generation means simultaneously with start of release of the product from the material hold means or cutting-off processing, or in a predetermined timing after the cutting-off processing starts;
stopping the suction air generation means, after the product released from the hold means or the product cut from the material is recovered in the recovery container;
disposing a coolant reservoir portion in the recovery container;
opening a discharge port disposed in the coolant reservoir portion to discharge a coolant when the coolant pooled in the coolant reservoir portion exceeds a predetermined amount; and
closing the discharge port to hold airtightness of the recovery container by pressure difference between inside the recovery container and outside when the suction air generation means is driven.

26. The product recovery method according to claim 25, further comprising the steps of: disposing air jet means for spouting compressed air to a tubular portion of the product recovery tube; spouting the compressed air into the suction tube from the air jet means simultaneously with the stopping of the suction air generation means; raising air pressure in the recovery container and opening a discharge port of a valve body to discharge the coolant to the outside of the recovery container; and cleaning the inside of the product recovery tube with the compressed air.

27. The product recovery method according to claim 25, further comprising the steps of: preparing a plurality of product receivers for receiving the product in the recovery container so that the product receivers can move; locating the product receivers in predetermined positions by location means based on an instruction from control means; and continuously recovering the products.

28. The product recovery method according to claim 25, further comprising the steps of: dividing the recovery container into a container upper part and container lower part: preparing a plurality of container lower portions in the container lower part; locating one of the container lower portions in a predetermined position with respect to the container upper part by location means based on an instruction from control means; and continuously recovering the product.

* * * * *